United States Patent
Ledet

(10) Patent No.: US 10,021,234 B1
(45) Date of Patent: *Jul. 10, 2018

(54) WIRELESS DEVICE GESTURE DETECTION AND OPERATIONAL CONTROL

(71) Applicant: OPEN INVENTION NETWORK LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,733

(22) Filed: Mar. 16, 2017

Related U.S. Application Data

(63) Continuation of application No. 15/167,323, filed on May 27, 2016, now Pat. No. 9,600,082, which is a continuation of application No. 14/444,138, filed on Jul. 28, 2014, now Pat. No. 9,357,048, which is a continuation of application No. 14/028,634, filed on Sep. 17, 2013, now Pat. No. 8,792,944, which is a continuation of application No. 13/851,277, filed on Mar. 27, 2013, now Pat. No. 8,577,422.

(51) Int. Cl.
*H04M 1/725* (2006.01)
*H04W 4/12* (2009.01)
*G06F 3/0488* (2013.01)

(52) U.S. Cl.
CPC .... *H04M 1/72519* (2013.01); *G06F 3/04883* (2013.01); *H04W 4/12* (2013.01)

(58) Field of Classification Search
CPC ....... H04W 4/027; H04W 4/026; H04W 4/12; G06F 3/017; G06F 3/04883; G06F 3/0488; H04M 1/72519
See application file for complete search history.

(56) References Cited

U.S. PATENT DOCUMENTS

| 8,228,292 | B1* | 7/2012 | Ruiz | G06F 1/1626 345/156 |
|---|---|---|---|---|
| 2012/0100889 | A1* | 4/2012 | Kim | G06F 1/1694 455/556.1 |
| 2014/0099992 | A1* | 4/2014 | Burns | G06F 3/044 455/550.1 |

* cited by examiner

Primary Examiner — Margaret G Mastrodonato

(57) ABSTRACT

Wireless device gesture detection and operational control comprises identifying a first position of the device based on a sensor reading of at least one sensor operating as part of the device. The method may also include identifying a change in the device's position to a second position that is different from the first position, and receiving a specific pattern of touch input data on a touch pad of the device, the specific pattern of touch input data identified as a predefined object which corresponds to dimensions of a human ear being pressed against the touch pad and changing a current operating state of the device to a different operating state based on a comparison and detection operation.

17 Claims, 23 Drawing Sheets

```
static BOOL L0AccelerationIsShaking(UIAcceleration* last, UIAcceleration * current, double threshold) {
    double
            deltaX = fabs(last.x - current.x),
            deltaY = fabs(last.y - current.y),
            deltaZ = fabs(last.z - current.z);
    return
            (deltaX > threshold && deltaY > threshold)  |
            (deltaX > threshold && deltaZ > threshold)  |
            (deltaY > threshold && deltaZ > threshold);
}
@interface L0AppDelegate : NSObject <UIApplicationDelegate> {
        BOOL histeresisExcited;
        UIAcceleration * lastAcceleration;
}
@property(retain) UIAcceleration * lastAcceleration;
@end
@implementation L0AppDelegate

- ( void )applicationDidFinishLaunching:(UIApplication *)application {
        [UIAccelerometer sharedAccelerometer]. delegate = self;
}

- ( void ) accelerometer:( UIAccelerometer *)accelerometer didAccelerate:(UIAcceleration *)acceleration { if (self.lastAcceleration) {
                if (!histeresisExcited && L0AccelerationIsShaking(self.lastAcceleration, acceleration, 0.7)) {
                        histeresisExcited = YES;

/* The user has performed the shaking action successfully */

} else if (histeresisExcited && !L0AccelerationIsShaking(self.lastAcceleration, acceleration, 0.2)) {
                   histeresisExcited = NO;
                }
         }
         self.lastAcceleration = acceleration;
}
@end
```

FIG. 17

WIRELESS DEVICE GESTURE DETECTION AND OPERATIONAL CONTROL

CROSS REFERENCE TO RELATED APPLICATIONS

The present patent application claims priority from and is a continuation of patent application Ser. No. 15/167,323, entitled WIRELESS DEVICE GESTURE DETECTION AND OPERATIONAL CONTROL, now issued U.S. Pat. No. 9,600,082, issued on Mar. 21, 2017, which is a continuation of patent application Ser. No. 14/444,138, entitled WIRELESS DEVICE GESTURE DETECTION AND OPERATIONAL CONTROL, now issued U.S. Pat. No. 9,357,048, issued on May 31, 2016, which is a continuation of patent application Ser. No. 14/028,634, entitled WIRELESS DEVICE GESTURE DETECTION AND OPERATIONAL CONTROL, filed Sep. 17, 2013, now issued U.S. Pat. No. 8,792,944, issued on Jul. 29, 2014, which is a continuation of patent application Ser. No. 13/851,277, filed Mar. 27, 2013, entitled WIRELESS DEVICE GESTURE DETECTION AND OPERATIONAL CONTROL, now issued U.S. Pat. No. 8,577,422, issued on Nov. 5, 2013, the entire contents of each of these applications are incorporated by reference herein.

TECHNICAL FIELD OF THE APPLICATION

This application relates to wireless device gesture detection and operational control.

BACKGROUND OF THE APPLICATION

Conventionally, wireless device are operated by pressing buttons and initiating acceptance messages prior to initiating a particular action or function (e.g., sending a call, accepting a call, generating a message, etc.). When in a meeting or otherwise attending an event that requires silence or some degree of discretion, it is usually necessary to avoid any incoming messages/texts/emails until after the engagement is completed. At that point after the meeting has ended, it is customary to review all of the incoming data messages and attend to each item separately. In the event that multiple items were received from a single contact, each of the items needs to be attended to separately and many of the received items could be from separate communication standards (e.g., voicemail, email, short message service (SMS) text messages, etc.).

Additionally, the way a user interacts with their smart phone or wireless device when answering calls, emails, messages, etc., may require extra time to select or deny options and navigate from one message to the next message.

SUMMARY OF THE APPLICATION

One embodiment of the present application may include a method of identifying a first position of a wireless device based on a sensor reading of at least one sensor operating as part of the wireless device, storing first position data corresponding to the first position in a memory, identifying a change in the wireless device's position to a second position that is different from the first position, storing second position data corresponding to the second position in the memory, receiving a specific pattern of touch input data on a touch pad of the wireless device, the specific pattern of touch input data identified as a predefined object which corresponds to dimensions of a human ear being pressed against the touch pad, processing the first position data, the second position data and the specific pattern of touch input data to create a set of gesture data, comparing the set of gesture data to a predefined set of gesture data stored in the memory to identify whether a predefined wireless device operation has occurred, and if the predefined wireless device operation has occurred then changing a current operating state of the wireless device to a different operating state.

Another example embodiment of the present application may include a wireless device including at least one sensor, a touch pad configured to receive touch input data, a processor configured to identify a first position of the wireless device based on a sensor reading of the at least one sensor operating as part of the wireless device and a memory configured to store first position data corresponding to the first position, and wherein the processor is also configured to identify a change in the wireless device's position to a second position that is different from the first position and the memory is also configured to store second position data corresponding to the second position. The apparatus may also include a receiver configured to receive a specific pattern of touch input data on the touch pad, the specific pattern of touch input data identified by the processor as a predefined object which corresponds to dimensions of a human ear being pressed against the touch pad, and the processor is also configured to process the first position data, the second position data and the specific pattern of touch input data to create a set of gesture data, compare the set of gesture data to a predefined set of gesture data stored in the memory to identify whether a predefined wireless device operation has occurred, and if the predefined wireless device operation has occurred then change a current operating state of the wireless device to a different operating state.

BRIEF DESCRIPTION OF THE DRAWINGS

FIG. 17 illustrates an example computer code used to identify movement and gyroscope data, according to example embodiments.

DETAILED DESCRIPTION OF THE APPLICATION

Figure 1:
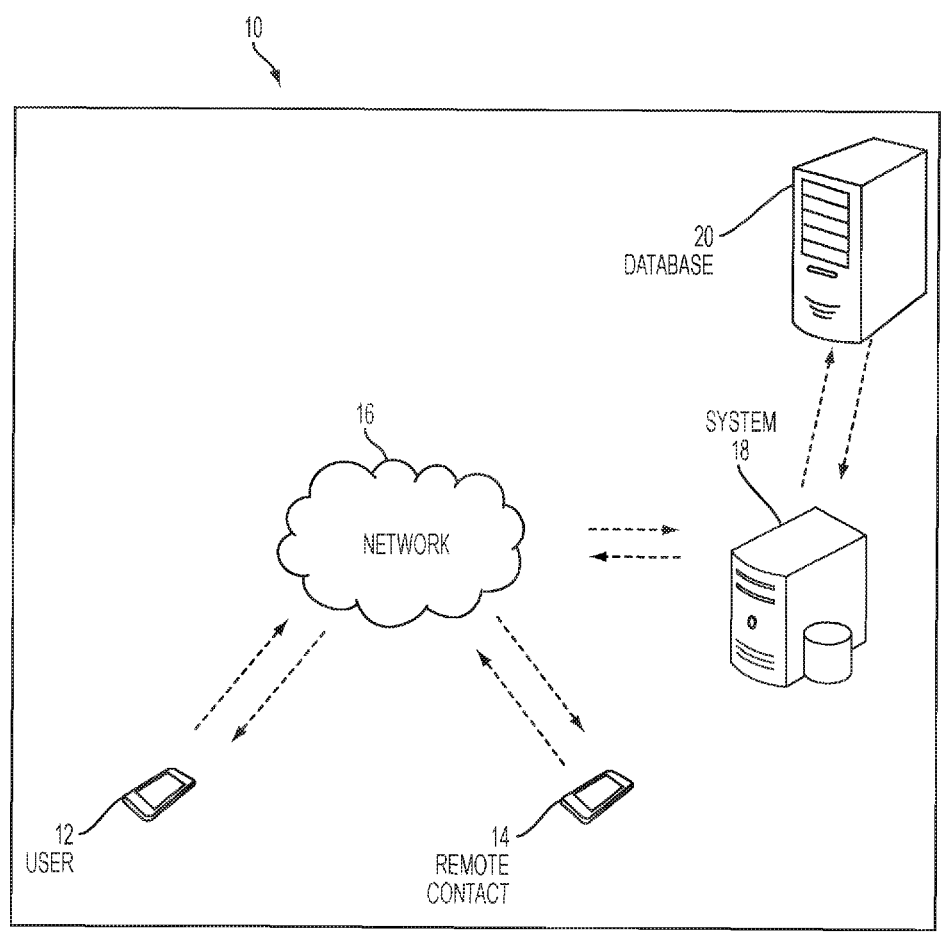
FIG. 1 illustrates an example communication network that supports wireless device communication operations, according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide message management options during an event. For example, a user of a computing device may operate an application that permits a user to receive a message, which is a summary of one or more data inputs addressed to and received by a device associated with that user. The user may have the options to receive the data, to receiver additional data or other options by initiating a gesture via the user's device.

The device may be a computer, laptop, mobile, wireless or cellular phone, a PDA, a tablet, a client a server or any device that contains a processor and/or memory, whether that processor or memory performs a function related to an embodiment.

The software and/or hardware application of the present application permits the various received messages to be combined into a single message that is delivered to the user containing all of the relevant information from more than one of the previously received messages regardless of the type of received message. The application may also respond back to the sender of the message automatically without interaction from the user. In addition, functional interactions are presented which allow for intuitive interactions including automatically placing a call to a contact who initiated the message when the user of the mobile station selects that contact's message or interfaces with the contact's message while bringing the phone up to the user's ear to listen and respond to messages and related prompts.

FIG. 1 illustrates a system diagram of a communication network. Referring to FIG. 1, the communication network permits a user utilizing a client device (i.e., wireless device or mobile station—hereinafter used interchangeably) 12 to access an application in the form of software, for example, to be downloaded from the databank system 18 or that currently resides on the client's device 12. The client device 12 can be any of a mobile laptop device and/or a personal desktop computer or a mobile device, smartphone, tablet computing device, etc. The computing device 12 is connected to the network 16, which may include the Internet, the cloud, etc. It should be noted that other types of devices, in addition to devices 12 and 14, might also be used. For example, a personal digital assistant (PDA), a tablet computer, a laptop, an MP3 player, a gaming device, such as a hand held system or home based system, and the like including a PC or other wired device that can also transmit and receive information could be used with the present example embodiments.

The user may interface through the client device 12 and connect through the network 16 to the computer system 18. The system 18 can be redundant or may be more than a single entity without deviating from the scope of the application. One or more remote contacts 14 also exist and interact with the system 18 through the network 16. The remote contact device 14 can be any of a mobile laptop device and/or a personal desktop computer or a mobile device. The remote contact-computing device 14 may be connected to the network 16. It should be noted that other types of devices, in addition to devices 14, might be used with the present application. For example, a PDA, a tablet computer, a laptop, an MP3 player, a gaming device (such as a hand held system or home based system) and the like (including a P.C. or other wired device) that can also transmit and receive information could be used with the present invention.

An offsite or cloud-based database 20 may also be part of the network 10 and can be directly connected to the system 18, or may be remotely connected through the network 16 without deviating from the scope of the present application. In an example embodiment of the present application, filtered data messages may be received on behalf of the user's mobile station account, email address, phone number, etc., and may be stored in the system 18 and/or the database 20 (e.g., home location register HLR, base transceiver station (BTS)) in lieu of the application executing on the user's device 12.

The application may reside on the user's device 12 which can be a mobile station, but can also reside on a user's desktop computer, a personal digital assistant (PDA), tablet computer, or any other device containing a processor, memory, and an operating system. If the application resides on a mobile device, the application may be downloaded through a communication platform, such as an application store or market residing on the device or accessed remotely via the device.

The current application can work with any device, such as a personal computer with a touch screen, a laptop with a touch screen, a personal computing tablet, a smartphone or any device with a processor, memory and a touch screen.

In one example embodiment of the present application, the current user application permits the user to easily receive multiple received data inputs by combining them into a single message presented to the user for review, modification, acceptance, rejection, etc. At times, various messages are received from a single user in the form of a SMS text message, a voicemail, and an email. The multiple messages may be received by the mobile station operated by the user, but the user may be unable to attend to the messages which may queue up in the device's memory. The received data can be stored in the system 18 or the database 20. The type of received data can be in the form including a voice message (converted to text), SMS text message, email, image, video, a social network update message, a blog entry from a user that is being followed or any other message that is from a user received in any data format.

For voice messages, the voicemail audio may be converted to a text representation. One example may be a current application that converts voice messages into text messages. Utilizing a proprietary word verb engine, voice messages may be converted into text messages and delivered either as an email, SMS or via an API interface to a social networking application or word having interface.

In another embodiment of the current application, the user may have the option to specify the type of data that is presented from a specific person. For example, if a friend is always known for sending images, the user will have the option to only deliver images from that person or user. In another example, if a friend is usually texting, the user specifies that only text messages be delivered to that user based on information retrieved from a different application (i.e., voicemail).

The system 18 permits the user to specify only certain messages to be delivered within a certain timeframe. For example, the user can specify through the application's GUI that a contact's texts are only delivered to the user, and the other messages are queued until the timeframe (e.g., working hours, lunch time, etc.) is completed. For example, the user may be in a meeting and desire only text messages to be delivered during the meeting. Furthermore, the user is able to configure the timeframe of the meeting and which text messages are allowed through during the meeting and which setting expires when the meeting is completed allowing all forms of communication to work as they normally would outside the restriction.

The system 18 allows for grouping certain contacts such that the user is able to select a group of contacts and assign functionality to only those in the group. In this example, the user can select a group of users (for example the user's family and close friends) then configure the application and notify the System 18 to allow only their texts to be delivered during the meeting. Using the application's GUI, the user would choose that group of contacts, then configure the System 18 to allow ONLY text messages be delivered from that group until the meeting is over. This functionality can be associated with a single contact or a group of contacts.

By another example only, the user may be traveling overseas and only desire to receive text messages or emails and no voicemail to keep expenses lower and keep communications simpler. The user may configure the system 18 in this example by first inputting a timeframe of the travel (e.g., flight time), then dictate that only text messages and emails be delivered during the timeframe by selecting such options via a user interface of the application. The system 18 would then queue all other messages delivered to the user until the timeframe is complete. A message would be delivered to the user at that time containing all other messages separated by message headers and each being in a text format for easy identification, dismissal, response, etc.

The functionality of the present application allows a user's device to become increasingly intelligent as it performs more functionality than is currently available. The functionality permits the system to perform automatic responses to received messages. These responses are prefixed with text reflecting that the message was automatically generated and sent, which allows the user to understand that the response was not from the user 12, but from the application of the present application and/or the system 18. The system 18 will automatically analyze the received messages that have been filtered from the user 12 and attempt a response without the user's live interaction. If the system 18 is able to respond automatically, the summary message delivered to the user 12 will include an automatic response for verification or modification prior to any further action being taken.

Figure 2:
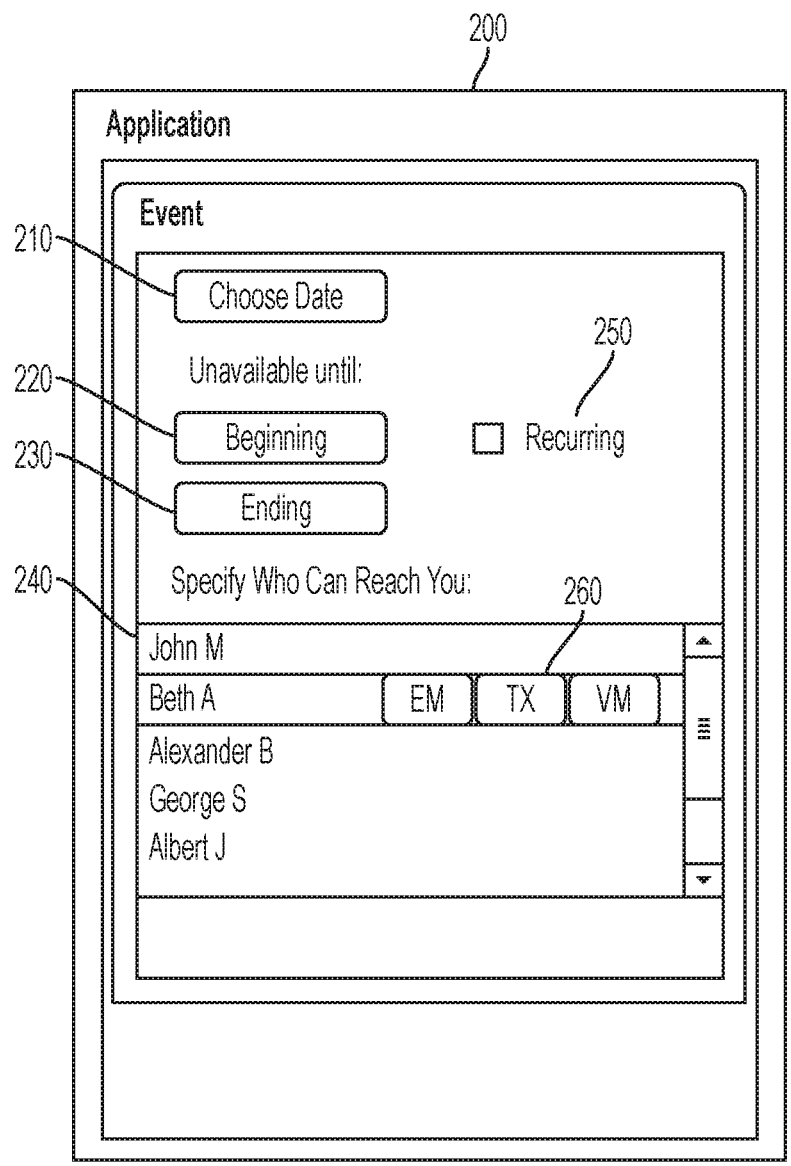
FIG. 2 illustrates an example user interface for customizing user preferences, according to example embodiments.

FIG. 2 illustrates an example GUI depiction of configuring an event. Referring to FIG. 2, the user may be configuring the application for an event that includes messages not being delivered via the user interface 200. A user versed in programming GUI techniques may choose to implement the GUI front-end in another manner that performs similar functionality without deviating from the scope of the application. The user may select the "Choose Date" button 210. This opens up to a date selector or another similar component implementation so the user can select a particular date. There also may be a "Today", "Tomorrow", etc. button enabling the user to choose a particular day and bypass the "Choose Date" button functionality.

Once the date is set, the user may select the "Beginning" option 220 and/or the "Ending" option 230, which enables the choosing of the start and end times that the user desires not to be disturbed by messaging. When these items are selected, another component opens allowing the selection of the times of the day. The user can select the "Recurring" checkbox 250 enabling the scheduling of future recurring events. When pressed, another component can open enabling the user to choose the specifics of the recurring event (e.g., daily, weekly, etc.) as well as how often it repeats within the timeframe and when the event ends. This functionality permits the user to set up message filtering during a weekly recurring meeting.

The list at the bottom 240 permits the user to select exceptions to the rule. For example, the user may desire to only accept messages from a certain person. In the GUI depiction, the user has chosen "Beth A", the second contact in the list of contacts as a potential recipient. As a sample of one implementation of the application, when the contact is selected, there are three items that are placed on the GUI stage: "EM, "TX" and "VM" 260. The "EM" button relates to emails, the "TX" button relates to SMS text messages and the "VM" relates to voice mails. The user has the option to press one or more of the buttons and the system 18 will then permit these types of messages to be passed through and not queue the messages for later delivery. The application interprets this action as if that contact sends an email, it will queue the email during the set time unless the user has selected the "EM" button on his/her contacts in the list. The user has the ability to choose one or more contacts in the exceptions by continuing to select them in the list 240. One versed in current application programming techniques will understand that FIG. 2 depicts one example of the possible interpretation of the implementation of the current application. For example, in the list 240, in place of having a single recipient per row, a previously identified group of recipients can be listed. Therefore, when a particular group of recipients are selected, the user would be able to select which types of messages (e.g., voicemails, emails and texts) are allowed through the filter when the application is activated. This embodiment permits the user to specify that only messages received from a certain person or a group of people may be received. Also, the user is able to specify which types of messages are allowed through the filter. The rest of the messages are queued by the system 18 and delivered at a later time specified by the user's selections.

The application of the present application also permits only a certain type of messages to be received during the event. For example, the user may just want text messages to be received during traveling to limit costs. The GUI of the application would offer checkboxes (not depicted) in FIG. 2 so the user would select the types of messages to be received, and all others would be filtered. The application of the present application also allows the user to query all events registered in the system 18 (not depicted). In this example, the user is able to view and edit all standing events, as well as easily view all current filtering parameters and exceptions or people and or groups that will pass through the filtering.

In another embodiment of the current application, the system 18 attempts to authenticate the users in the system 18. In doing so, the user is providing permission for the system 18 to have access to the specific information that it may use to intuitively communicate with the user's contacts. The information may include one or more of the user's contacts, image files, video files, email data, calendar data, and documents. This access allows the system 18 to pull data from the user allowing more intuitive interaction in regards to the functionality of the present application.

There are acceptable methods allowing an application to retain access to the specific data related to a user. For example, in a mobile device application, such as ANDROID® application programming in this case, applications running on the ANDROID platform have a limited range of system 18 resources. The system 18 manages the application programs that, if utilized incorrectly or maliciously, could adversely impact the user experience, or halt basic operations of the device in general. These restrictions are implemented in a variety of methods. Some capabilities are restricted by an internal lack of application program interfaces (APIs) to the sensitive functions of the system 18 as well as other adverse effects. Protected APIs are published allowing certain basic operating system 18 level controls including location data (GPS), camera functions, BLUETOOTH wireless functionality, telephony functionality, SMS/MMS functionality, and network/data connections.

The resources are accessible through the operating system of the system 18. To make sure the use of protected APIs is performed on the mobile device, an application should define the capabilities in a document called the "manifest". When preparing to install an application, the system 18 displays a GUI dialog to the user indicating the permission requested and asks whether or not to continue the install. This allows the user to back out of installing the application if unsure about the permissions that the application is requesting. Once granted, the permissions are applied to the installed application as long as the install is successful. If there is an update to the application installed on the user's device, this GUI dialog is again displayed for verification from the user. If the application attempts to access functionality not explicitly defined in the manifest, the application will typically result in a security exception executed causing the application to exit. Through the authentication, the system 18 may obtain access to each of the items of the user's personal data, and can perform more intuitive processes allowing for an optimal implementation. For example, the system 18 can access the user's 12 calendar data to check for an upcoming meeting that may have been mentioned in a received message. This may enable the system 18 to identify the meeting name, data and/or time, parse that information and automatically respond to the received message without any interaction by the user 12.

As another example, the system 18 would have access to the user's 12 local files and be able to automatically send a response to a received message that mentions the file. As yet another example, the system 18 would have access to the user's 12 email and SMS text data. Through this interface, the system 18 would be able to obtain previous communication between the user 12 and the contact that sends a message. The system 18 would then be able to respond intelligently to the received message as it gains an understanding of the previous communication.

As yet another example, the System 18 would have access to the User's 12 previous geographic location history. Through this interface, the System 18 would be able to ascertain the geographic location of where the User 12 has been and this may help the System 18 respond to a message intelligently. As yet another example, the system 18 would have access to the user's 12 contact information. This interface would allow the system 18 to provide any contact related information that would aid in intelligently responding to a request from a contact regarding a request for one of the user's 12 contacts stored in their device. The user may identify one or more automatic responses that are prepared for review before being sent. This enables the user to approve, finalize, modify and/or reject one or more of the automated responses. Utilizing all of the above functionalities, the system 18 can act on behalf of the user and respond to messages in place of the user 12.

In another embodiment of the present application, the system 18 begins to store a history of communication data as related to the user 12 in its one database either internal to the system 18 or accessible as an external database 20. Also recorded in its own database are previous communications between the user and contacts. As this occurs, the system 18 will be better configured to quickly and intelligently process received messages and respond increasingly more intelligently as it learns who the user 12 normally interfaces with and who the user 12 has as its groups of contact. For example, his/her work contacts, his/her personal relationships and the division between the user's 12 close personal relationships, semi-personal relationships, and those that are distant contacts. The system 18 would be able to then relate on a more personal level, as it understands the personal connection between that contact and the user 12. This user specific data is stored in the system 18 in a database that is queried for information. This can be implemented in a full structured query language (SQL) database, or a more simplified version, such as MySQL. Using the database, the system 18 can quickly query for contacts, previous emails, previous chats, prior geographic location, event data from the user's 12 calendar application, etc.

Figure 3:
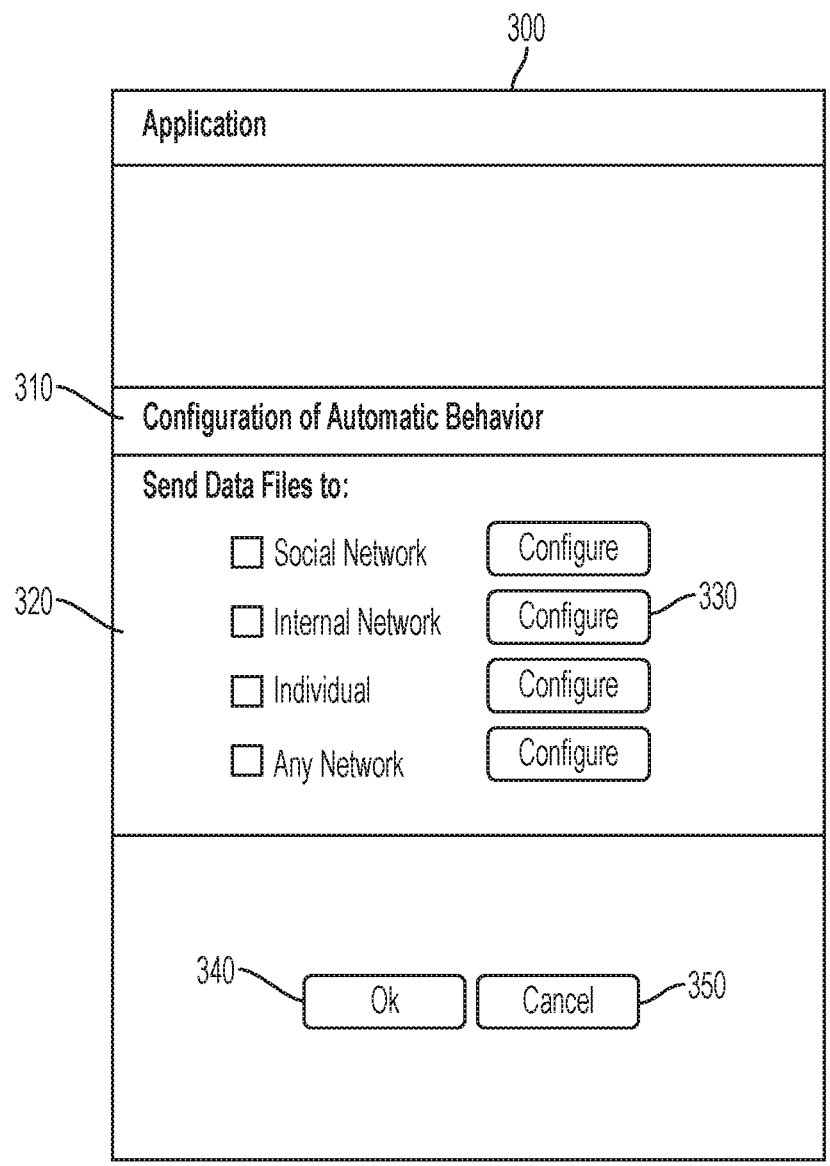
FIG. 3 illustrates an example user interface for customizing data file sharing sources, according to example embodiments.

FIG. 3 illustrates the configuration of the automatic sending of files. Referring to FIG. 3, the user has the ability to configure how the system 18 will handle the automatic sending of files to contacts 300. The panel "Configuration of Automatic Behavior" 310 allows the user to specify how the data files will be transmitted. The user can specify whether the files should be sent, for example, to four various entities 320. The options may include but are not limited to a social network, an internal network, for example, an internal company network, an individual or any other particular network. In each of the choices, there exists a "Configure" option 330 allowing the particular option to be further specified (not depicted). For example, for the social network option, the further configuration could specify which social network (i.e. TWITTER, FACEBOOK, LINKEDIN, etc.). For the Internal network, the user can specify the location of the repository and/or web location within the internal network. The any network option can be further configured to specify where in the Internet the system 18 would send the file.

According to one example, the user may select the "Ok" button 340 to complete the configuration and the window may be removed. The specified configuration is written to the internal (or external) database 20 of the system 18. The user may select the "Cancel" button 350 to cancel the configuration process and the window is then removed.

In another example embodiment of the current application, if a voicemail is left for the user, the system 18 is able to correspond automatically with the person by responding to the person via a SMS text message, such as "The person you have left a voice mail for is currently not accepting voice mails and is only accepting text messages or emails at this time—Press 1 now to have your message converted to a text message." The system 18 permits the user to have the voicemail automatically converted to a text message by responding to the person: "If you would like your voice mail translated to text and sent as a text message, press 1." The system 18 also corresponds with the option: "If you would like your voice mail translated to text and sent as an email, press 2." The system 18 also corresponds with the option allowing the voicemail to be delivered and informs the user that it will be delivered when the timeframe expires: "If you would like your voice mail to be delivered, it will be delivered at XX:YY time and/or on XX/YY/ZZ date— please press 3 for this option." Finally, the system 18 permits the user to cancel the operation: "If you would like to cancel your voice mail, please select 4."

The present application permits the various received messages to be combined into a single message (SM) delivered to the user containing all of the relevant information from all of the previously received messages regardless of the type of received messages. The system 18 permits the user to specify the number of SMs to be delivered in a certain timeframe. For example, the SM is delivered once per hour/day/week/etc. The user can specify when the SM is delivered by including a time option in the GUI. The SM may be delivered at multiple times per day. The user can specify the time at which the SM is delivered in the GUI.

In another embodiment of the current application, previously received messages are presented chronologically in the order received. For example, if a text message were received from a person, followed by a voice mail, following finally by a second text message, the first text, then the voicemail (converted to text), then the second text message would be delivered to the user in that order. All of the received messages can be stored in the user's device 12. The system 18 may store all of the queued messages in an internal or external database 20 that is remotely queried utilizing query functionality such as a server-side embedded scripting language hypertext preprocessor (PHP) or a query language, such as a structured query language (SQL).

In another example embodiment of the present application, only new information is delivered to the user. For example, assuming that a text message was received from a person, followed by a voice mail that contained 75% of the same information as the first text message, followed by a second text message that contained 85% of the same information as the first text message and the voicemail, then the entire first text message would be delivered to the user, followed by the 25% of the voice mail (converted to text) that is new, and finally the 15% of the second text message that is new. This will assure that only message delivered to the user is only relevant information devoid of any redundancy. In this example, the stored messages are parsed by the system 18 and common words and/or phrases are grouped together to determine if there is repetition in the at least two messages received.

In this example, the system 18 parses through the queued messages using currently accepted parsing languages, such as the PERL language. For instance, the PERL "split" function is used to break up the line into separate words that can then be further processed as individual words instead of lines or sentences. Other Perl based generators include Parse-RecDescent with the ability to generate on-the-fly recursive-descent parsing, Regexp-Grammars as an implementation of the future PERL 6 grammars, Parse::Yapp which can be compared with a well known parse generator tool, and Parse::Eyapp an extended version of Parse::Yapp including new recursive constructs.

Once the message(s) are parsed, the words can be stored in the system 18 or the database 20 for further processing. The text in the messages is compared and similarities and differences are noted. Messages that are similar in nature are grouped together and become part of the synopsis portion of the summary message. In this example, only words unique to each message may be included in the summary of message to avoid over combining of redundant portions of a plurality of different messages that contain overlapping subject matter.

When analyzing previously received input, a synopsis of a particular element or a plurality of elements can be formulated and delivered in the SM to the user. For example, let us assume that the following are acceptable inputs A—SMS text, B—Voicemail (converted to text), C—Email, D—Blog Entry, E—Social networking update and F—Image. In one example of the current application, the SM (SM) contains the various received messages grouped together according to the type of message that was received. SM=(A1, A2, A3)+(B1, B2, B3)+(C1, C2, etc.). In this example, if there were two received SMS text messages received and three voicemails received, the first two SMS text messages would be listed followed by the three voicemails. In another embodiment of the current application, the SM (SM) contains the entire messages received as one group. For example, if the messages received were a SMS text message, a voicemail (converted to text) and an email, the SM would be calculated as: SM=A+B+C.

In another embodiment of the current application, the SM contains a synopsis of a grouping of any of the elements followed by the remaining elements. Such as: SM=Synopsis (ABC)+D+E+F. In this example, the stored messages are analyzed by the system 18 and are parsed to determine commonalities among the messages. The common messages are summarized by the system 18 and the summary (or synopsis) of the messages are sent in the SM sent to the user's device. In another embodiment of the current application, the SM contains a synopsis of the first three elements which is derived as well as a synopsis of the last three elements such as: SM=synopsis (ABC)+synopsis (DEF). The SM can be a text message that is sent by the application on the user's device 12. There is currently accepted functionality available to send SMS messages from a mobile device. For example the ANDROID operating system supports sending SMS text messages. To send an SMS text message, the SmsManager class can be used. Unlike other classes, this class does not have to be directly instantiated. Instead, the getDefault( ) static method to obtain an SmsManager object may be called. The sendTextMessage( ) method sends the SMS message via PendingIntent and the PendingIntent object is used to identify a target to invoke later. For example, after sending the text message, you can use a PendingIntent object to display another activity. In this case, the PendingIntent object is simply pointing to the same activity (SMS.java), so when the SMS is sent nothing will happen.

The process uses a PendingIntent object (sentPI) to monitor the sending process. When a SMS message is sent, the first BroadcastReceiver's onReceive event fires to perform a status check of the sending process. The second PendingIntent object (deliveredPI) monitors the delivery. The second BroadcastReceiver's onReceiveevent will execute when an SMS is delivered successfully.

In another embodiment of the current application, the SM is delivered on the user's device in a window on the GUI. The SM can contain data from a contact's SMS text, email, or text from a voicemail. There also exists a "More" button on the same GUI window. This button, when pressed allows more information to be presented to the user pertaining to the SM. The text that is selected prior to the "More" button being pressed or dragged into the "More" area is sent to the system 18 for further processing. The system 18 can provide additional information regarding the sent text such as, additional information from that user or user documents that can be accessed related to the message, or inquiring to the system 18 for more information, etc. Additional information may also include information from user's contacts, websites referenced to in the incoming data, information from websites pertaining to the incoming data, information from the blog entry referenced in the incoming data, and information from people who "liked" the blog entry referenced in the incoming data.

Figure 4:
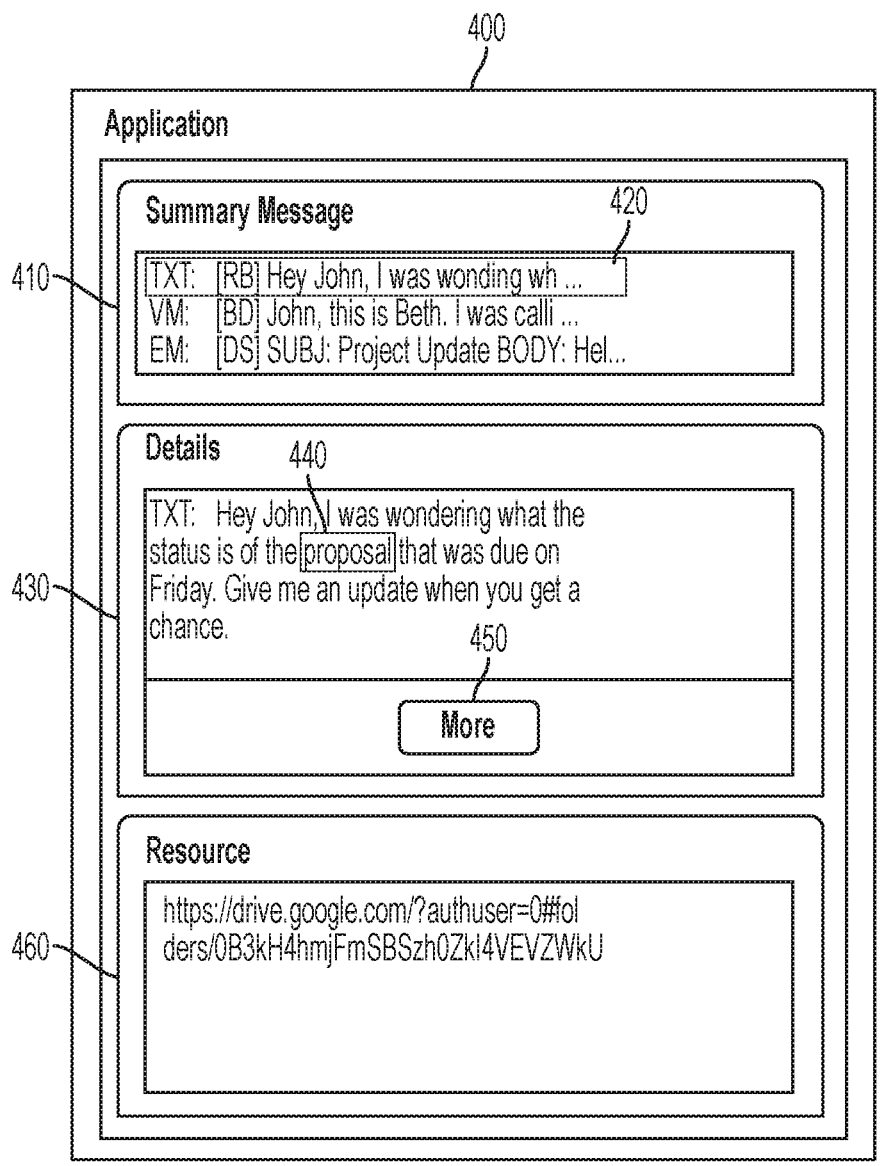
FIG. 4 illustrates an example user interface for identifying user messages, according to example embodiments.

FIG. 4 illustrates a GUI showing a device displaying what is received on a user's device display operating the application 400. The SM is illustrated in the first box 410. This illustrates all of the queued messages that were sent to the user. The initials at the start of the message indicate the sender's initials. In this example, there was a text message, a voicemail and an email that was queued. The text message is prefixed by "TXT", the voice mail that has been converted to text is prefixed by "VM" and the email is prefixed by "EM". The next panel labeled "Details" 430 is a panel that is utilized to expand the selected line in the SM panel. In this example, the first line is selected as indicated by the blue highlight 440. The details panel illustrates as much of the text as possible and a scroll bar (not depicted) is added to the right of the panel if more text is present that can be displayed in the panel.

The next panel is labeled the "Resource" panel 460. This panel is utilized when the "More" button 450 is press after the user presses or highlights a portion of the text in the details panel 430. When the "More" button is pressed, the application sends the highlighted text to the system 18 which attempts to provide additional information related to the sent text. The same functionality is performed when a portion of the text is highlighted by the user then drug into the area of the "More" button 450. This enables the user to select a portion of the text in one motion instead of having to highlight a portion of the text then press the "More" button 450. In this example, the system 18 determines the connection between the user and the contact and which document that is being referenced. Through previously configured authentication, the system 18 can determine that the document is stored in a document repository, for example GOOGLE DOCUMENTS or another repository. The system 18 can determine if the user and the contact have collaborated in the past on a document or if they were shared on one another's documents by gaining access to the API for GOOGLE DOCUMENTS.

The API permits developers to access the specifics of the user's documents including the sharing functionality. The published APIs permit developers to create, retrieve, update, and delete information including but not limited to text documents, spreadsheets, presentations, drawings, files, and collections. It also provides some advanced features such as resource archives, optical character recognition, translation, and revision history.

The system 18 accesses the URL of the highlighted document and provides this in the "Resource" panel 460. The user can click this URL and the document will be downloaded to the device for viewing or editing. The application can also provide the entire document that would be displayed in the "Resource" panel 460, or open another window with the document to be viewed.

In another embodiment of the present application, the user can control how the application responds to each of the received messages in the summary message 410. This permits the user to easily interact with the application allowing for specific responses. For example, the user can click the first message in the summary message 410 and input a "space" to the application from a keyboard on the display screen. This space input to the application informs the application that it is time to send out the response so the outgoing text message answers any question or clarifies whether any item in the incoming message without specific interaction from the user.

The user can also send a symbol from the keyboard to the application, for example a "*" symbol, which informs the application to respond to the contact with the same message type that was received. For example, if the incoming message were an email, then the application would respond to the user with an email message. Other symbols input to the application can signify other actions. The input can join the symbols in the message to the application (for example "space", *, !). As another example, assume that a contact named Bill sent a voicemail to the user that was not filtered by the application so the voicemail that is converted to a text message is displayed on the mobile device. The user, after seeing the message inputs a "*" using the keyboard on the display. This received symbol informs the application to parse the incoming message and to take action based on the parsing. The "*" symbol instructs the application to respond to the contact in the same format as what was received so the application sends a voicemail message to Bill. The application can also be configured to override this functionality and respond to Bill via SMS text message or via email. This override function can be configured in the configuration of the application.

As another example, upon reception of a message from the application, the user can input "*+" to the application using the keyboard on the display. These received symbols instruct the application to perform two paths of functionality. The "*" symbol performs the same functionality as described in the previous paragraph. The "+" symbol instructs the application to automatically transmit an update message to the contact if there are updates to a related data item. For example, if the incoming message related to a calendar item, if this calendar item is changed, the application will update this change to the contact because the user has instructed the application to provide updates by issuing a "+" symbol via the keyboard. As another example, if the incoming message is related to a data file or if there are changes made to the data file by the user, then the application will notify the contact that an alteration was made to the related file.

The above examples permit the application of the present application to automatically keep the user's contacts informed of changes to data items that they previously referred to from previous incoming messages without the live or current interaction by the user. The configuration area of the application may allow the user to configure how long a time the application can monitor changes to the data objects (not depicted). For example, the configuration may permit the user to allow the application to monitor the related data objects for 3 weeks after the initial message, and afterwards the changes would no longer be monitored by the application.

Figure 5:
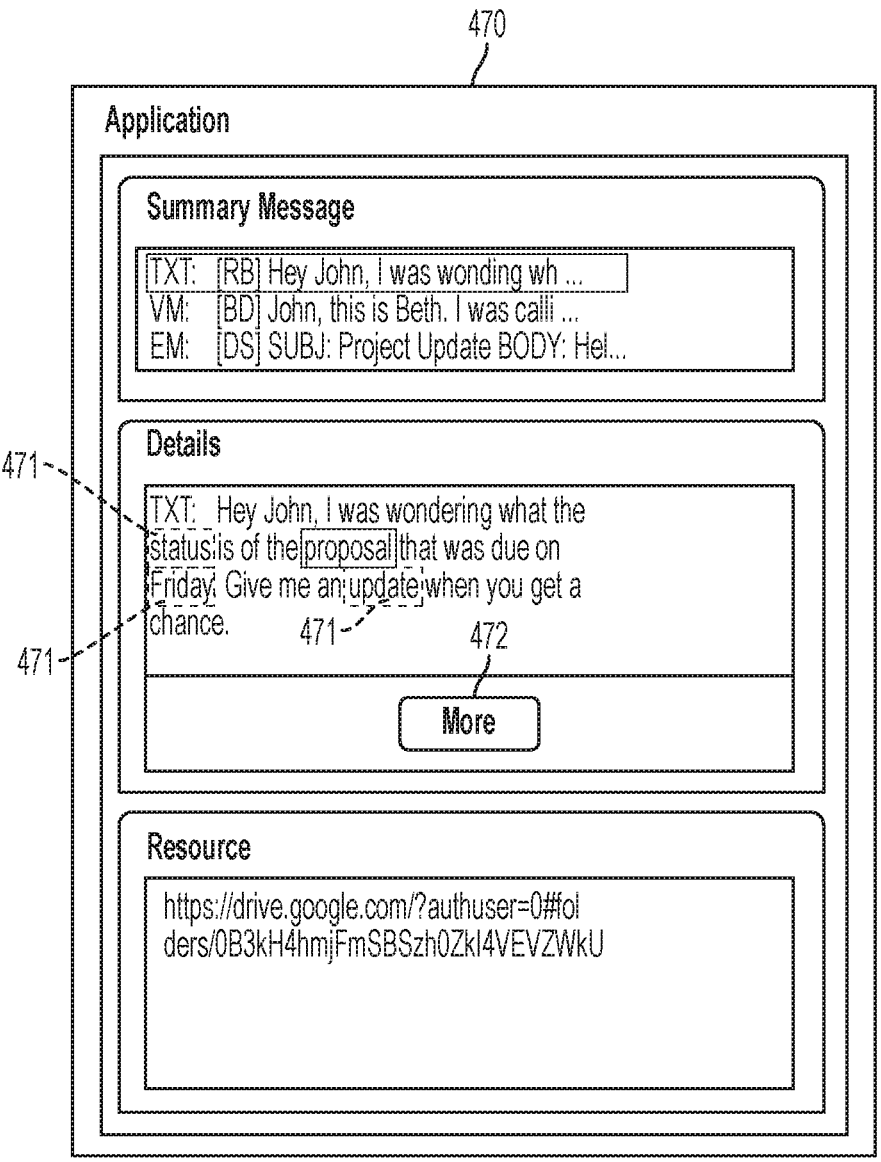
FIG. 5 illustrates an example user interface for identifying keywords in user messages, according to example embodiments.

In FIG. 5, another example of the summary message window 470 is illustrated. In this example, the user has highlighted three more words "status", "proposal", "update" and "Friday" 471. This example reflects that more than one word can be selected by the user to be utilized to be sent to the system 18. In one example, the user selects or drags the selected words into the "More" button 472. The application sends these words to the system 18 for analysis. Given the words that the user has selected, the system 18 processes these words and provides a response back to the user. In this example, the system 18 receives the words: "status", "proposal", "Friday" and "update". The system 18 can use none, more than one or all of the words can be considered by the system 18 for processing. The system 18 parses through these words, and searches through the user's previous communication between the user and the person who sent the message. This previous communication can be in the form of previous chats, previous emails between the two parties or previous voicemails that were recorded. Through the available words, the system 18 uncovers the location of the file that the recipient is referring to in the previously processed data.

The system 18 can use the identified, parsed and received word "Friday" to locate any calendar item in the user's calendar using published application program interfaces (APIs) published by software companies that implement calendar applications. Through this interface, the system 18 can obtain specific appointment and reminders in the user's calendar that refer to any other received words, such as "proposal". The system 18 can also search through the user's local files searching for any recently updated file with the word "proposal" as part of the filename. Any of these procedures can be utilized by the system 18 to locate the referenced file.

Figure 6:
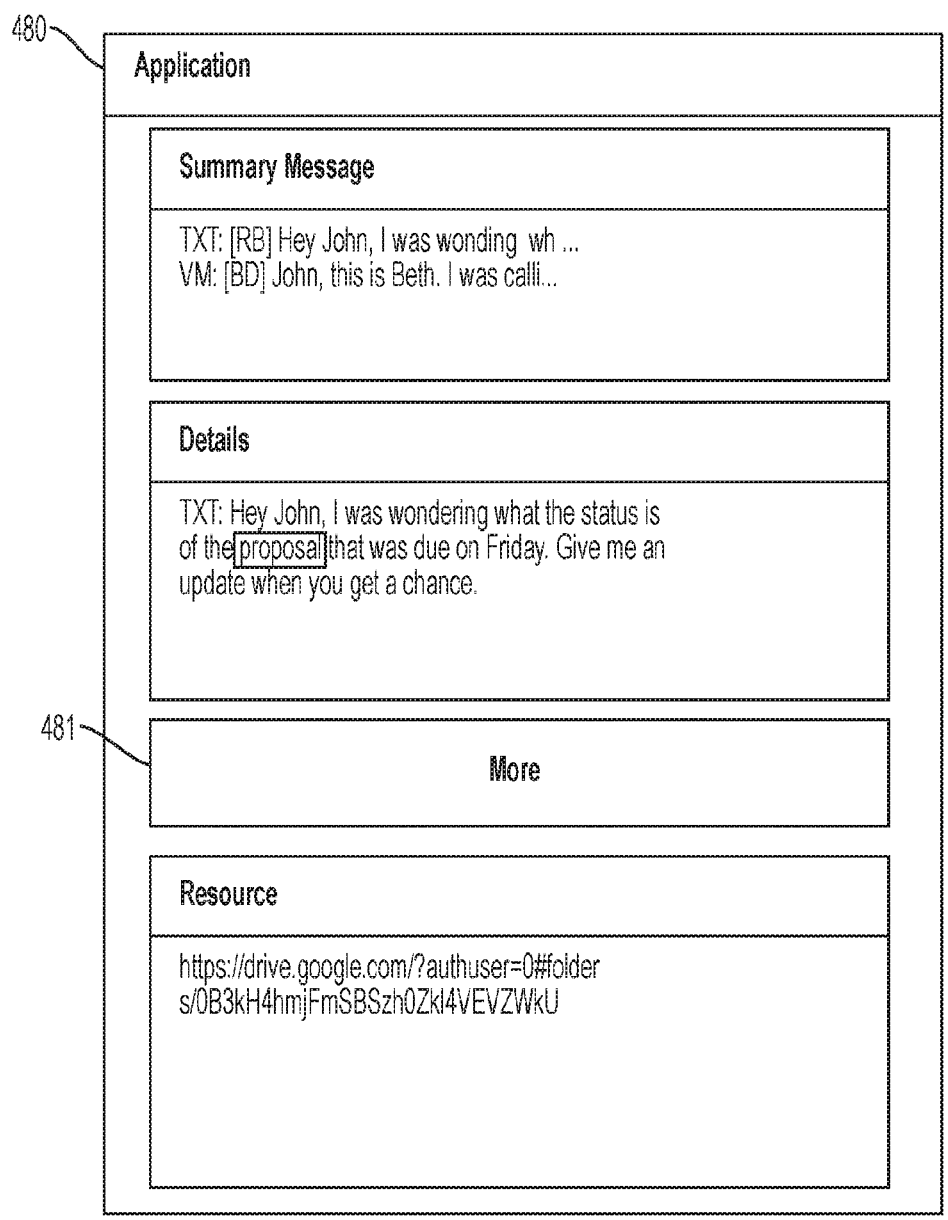
FIG. 6 illustrates another example user interface for identifying details of user messages, according to example embodiments.

FIG. 6 illustrates another embodiment of the GUI window 480 illustrating the summary message as related to the application of the present application. In this example, a "More" area 481 has replaced the "More" button. Instead of placing a button component, an area is placed on the stage so the user can drag text that has been highlighted. If on a mobile device, the text can be selected by holding a pointing device (i.e., a finger) on some text illustrated on the window and holding down the finger for a specified time. At that point, the application can identify that the user 12 desires to perform an alternate action, such as the selection action and the system responds by highlighting the selected text a different color. Once the text is selected (or highlighted), the user 12 would then be able to point on the highlighted text and move it around the stage. Once the user moves the selected text over the "More" area 481, the system responds by sending the text to the system 18 for further processing. The user 12 is able to select multiple portions of text using the same method described above to be processed and identified as relevant.

In another embodiment of the current application, the combining of both speech and gesture is used allowing further intuitive functionality for the user 12 to interact with the application. In this embodiment, while the user is performing a gesture or interaction with the application, the application will receive text input. This input, while received during the gesture movement will be processed by the application in a different manner than the speech received alone. This functionality will allow further intuitiveness in the functionality of the current application. To further illustrate the combining of speech and gesture, the interaction with the current implementation will be depicted. For example, in FIG. 6, the user had highlighted the word "proposal" with the desire to obtain more information regarding the highlighted word. With the current described functionality, the user must either drag the highlighted word into the "More" area 481, or click the "More" button 472. When combining the speech and gesture functionality into a single, fluid process, much more intuitive functionality can be introduced permitting more natural processing by the current application.

The examples will attempt to clarify the interaction of both voice and gesture as processing inputs to the current application. The examples will depict a select number of possible interactions that can be implemented. One versed in current application programming techniques will determine other examples that can be implemented bringing further intuitiveness to the application without deviating from the scope of the present application. The combining of both voice input and gesture is made possible by the combining of the touch gesture and voice-to-text functionalities interworked with the user's 12 mobile device software development kit (SDK). Speech recognition is built into many common mobile device SDKs. For example, in the ANDROID release of SDK 1.5, a library included in that release called 'android.speech' permits speech recognition functionality.

In ANDROID 1.5, speech recognition is accomplished through the 'RecognizerIntent'. The intent starts an activity that will prompt the user for speech and send it through the speech recognizer. For example, the code below starts an activity with an intent and the application waits for the result:

Intent intent=new Intent ("android.speech.action.REC-OGNIZE_SPEECH"); startActivityForResult(intent, 0);

The 'startActivityForResult' process launches an activity returning the result. While speech recognition is performed, it displays an overlay over your application, and which returns the results back for your activity to handle. The action: 'RECOGNIZE_SPEECH' starts an activity to recognize the speech and send the result back to the activity. The voice recognition application that handles the intent processes the voice input, then passes the recognized string back to the application by calling the 'onActivityResult( )' callback. ANDROID supports two language models for speech analysis: 'free_form' for dictation, and 'web_search' for shorter, search-like phrases. The examples in present application may utilize the 'free_form model'.

The example below depicts code to integrate speech-to-text to the application:

```
// Check to see if a recognition activity is present
PackageManager pkgmgr=getPackageManager( );
List activities=pkgmgr.queryIntentActivities(
    new    Intent(RecognizerIntent.ACTION_RECOGNIZ-
E_SPEECH), 0);
    if (activities.size( )!=0)
    {speakButton.setOnClickListener(this);
    } else
    {speakButton.setEnabled(false);
    speakButton.setText("Recognizer is not present");
    }
}.
```

The sample pseudocode above first verifies that the target mobile device is able to interwork with the speech input, then uses startActivityForResult( ) to broadcast an intent requesting voice recognition, including the extra parameter specifying one of two language models. The voice recognition application that handles the intent processes the voice input, then passes the recognized string back to the application by calling the onActivityResult( ) callback.

Further detailing both the speech-to-text and gesture functionalities on a mobile device, the gesture functionality is now functionally described. The touch gesture functionality is inherent on smartphones in the market today. This functionality allows the user to use their finger (or other touch mechanism) to interface with the mobile device.

A common smartphone operating system in the market today is the ANDROID, which provides the primary point of access for touch data via the 'android.view.MotionEvent' class. This class is passed to the views of the current application via the 'onTouchEvent' and 'onInterceptTouch-Event' procedures. 'MotionEvent' contains data about "pointers," or active touch points on the device's screen. Through a 'MotionEvent' you can obtain X/Y coordinates as well as size and pressure for each pointer. 'MotionEvent-.getAction( )' returns a value describing what kind of motion event occurred.

In the Android application environment, the onTouch event is fired when the touch screen is interacted with by the user's finger or touching device (i.e., stylus, etc). The application can handle the 'onTouch' event based on the following code:

```
public boolean onTouchEvent(MotionEvent event) {
    int action=event.getAction( );
    switch (action) {
    case (MotionEvent.ACTION_DOWN):
        // Touch screen pressed
        break;
    case (MotionEvent.ACTION_UP):
        // Touch screen touch ended
        break;
    case (MotionEvent.ACTION_MOVE):
        // Contact has moved across screen
        break;
    case (MotionEvent.ACTION_CANCEL):
        // Touch event cancelled
        break;
}
return super.onTouchEvent(event).
```

The pseudocode above handles different actions of the returned 'onTouch' event when the user interacts with the touch screen. The application can perform actions based upon the exact touch event operated by the system. Interacting touch gestures with speech recognition is possible by an application executing on a mobile device. As described above, classes exist that allow applications to call procedures for both functionalities.

Figure 7:
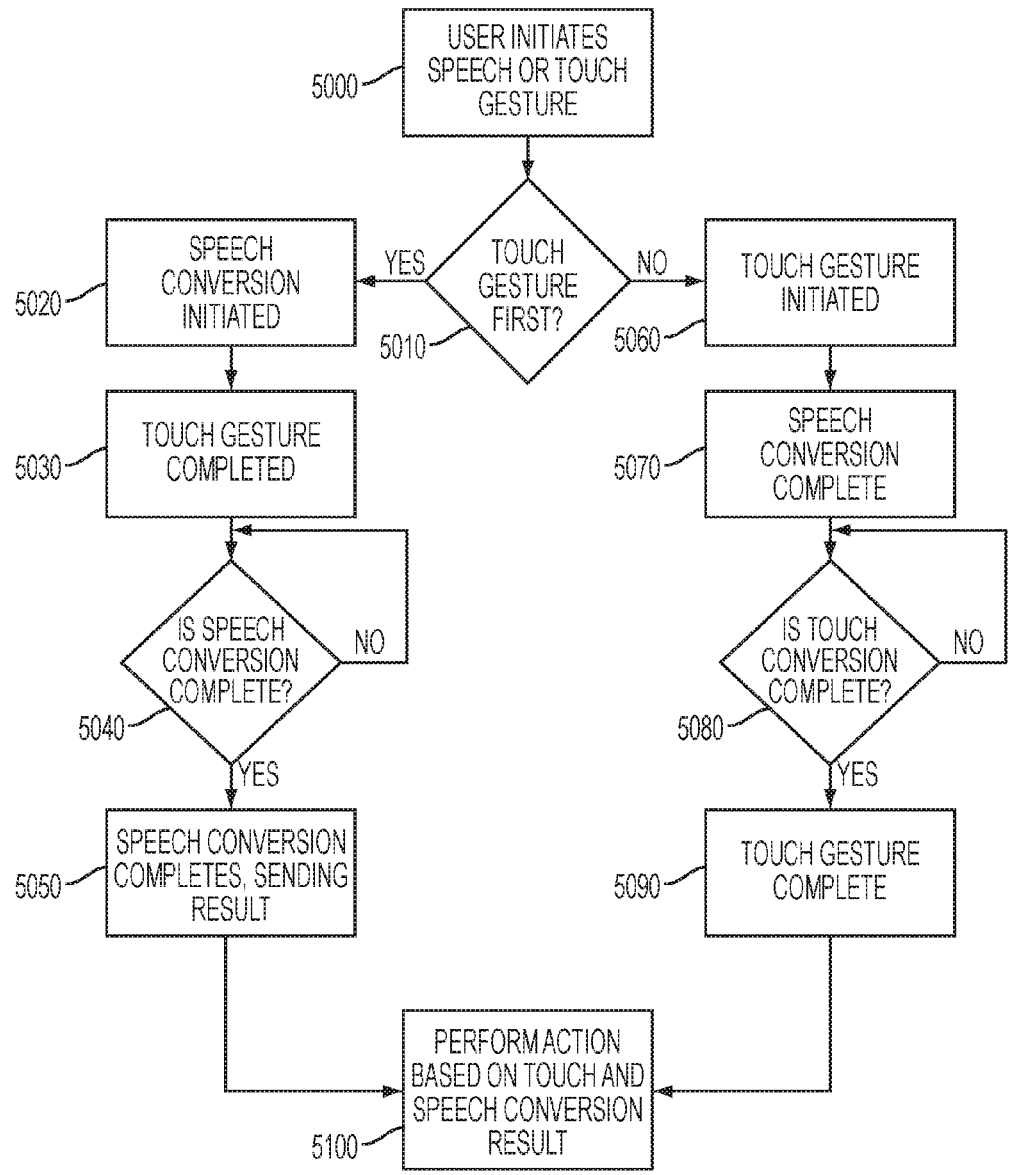
FIG. 7 illustrates an example flow diagram, according to example embodiments.

FIG. 7 illustrates an example flow diagram of a user speech/touch gesture configuration according to example embodiments. Utilizing both touch gesture and speech conversion permits an application to perform new functionality based on both input types. The user initiates either a touch gesture or speech into the device's microphone 5000. If the initial action was a touch gesture 5010, the speech conversion is initiated by allowing the user to speak into the device's microphone 5020. The touch gesture completes 5030 and the application waits until the speech conversion is complete to continue 5040. Once the speech conversion is complete the result of the conversion is made available to the application 5050. A new action may then be performed utilizing the result of both the touch gesture and the speech conversion 5100.

If the first gesture was speech and not a gesture 5010, the touch gesture is initiated allowing the user to perform a touch gesture on the device 5060. The conversion of the speech is then completed and the result is made available to the application 5070. The application waits until the touch gesture is received and completed before continuing 5080. Once the touch gesture is completed, the touch gesture completes and the result is made available to the application 5090. A new action is performed utilizing the result of both the touch gesture and the speech conversion 5100.

As an example of the gesture and voice-to-text combination functionality, a further flowchart depiction is permitted that further describes the interaction between these two functionalities to further depict how these two functionalities are combined on the user's mobile device. Now having provided a basis to the functionality supporting the combining of both gesture and voice-to-text functionalities, a further example flowchart will illustrate the combination of seemingly different functionalities.

Figure 8:
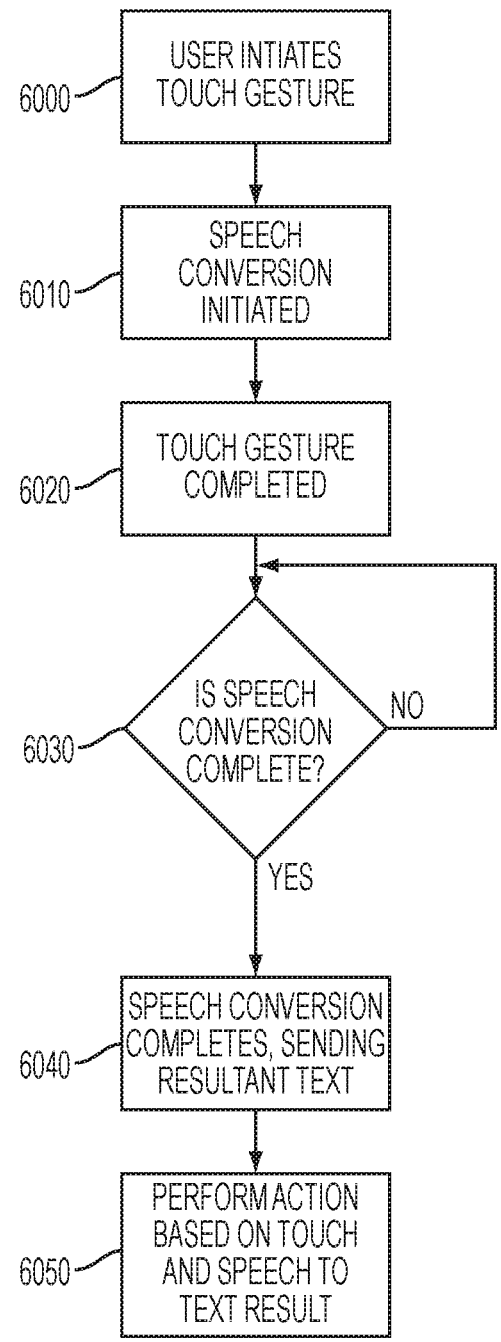
FIG. 8 illustrates another example flow diagram, according to example embodiments.

FIG. 8 illustrates another flow diagram example of a touch gesture and speech-to-text method of operation. Referring to FIG. 8, the interactions between the touch gesture functionality and the speech conversion functionality are described with reference to the operations of the flow diagram. This example illustrates the user first performing a touch gesture, followed by having certain speech converted to text. The user will initiate the process by beginning a gesture on the mobile device screen 6000 (i.e., touch input operation). Upon indication that the user has begun a gesture action, the application will initiate the speech conversion process 6010 where the user's speech is captured and converted to text 6030. The touch gesture functionality then completes 6020 after the speech conversion has been initiated. Normally, the application acts upon the completion of the gesture, but with this added functionality, the process may wait until the speech from the user is captured and converted to text 6030 before taking any actions in the application. Once the speech has successfully been converted to text 6040, this text string is returned to the application and processing of the application resumes. The normal activity of the gesture alone is combined with the string returned from the speech conversion and the new action is executed in the application 6050.

The functionality of the present application initiates speech conversion upon acknowledgement of the user beginning a touch gesture. For example, when the user initiates a touch gesture in the map application, the map application calls the 'RECOGNIZE_SPEECH' function or intent enabling the mobile device to also convert any speech data received. The result of the converted speech is utilized as input to the application, permitting the additional functionality combining the received touch gesture with the converted text.

In one example implementation, the user 12 will say the words "determine which proposal" when highlighting the word "proposal" 440 (as illustrated in FIG. 4). In this example embodiment, the user will not necessarily have to press or drag the word into the "More" button 450, but the following will be sent to the system 18 for further processing: Text: proposal Speech-To-Text: "determine which proposal." The speech from user 12 will be converted into text (as depicted above) and will be transmitted to the system 18, which will return a link or the entire document to the user 12 to be displayed in the resource panel 460.

In another example implementation, a message was delivered to user 12 from an authorized contact named "Robert" that was filtered and stored in the system 18. When the event timer expired, the system 18 may deliver a summary message to the user 12. The user may then discover that Robert delivered the following message: "When is the meeting for the proposal project, Dave?" In this example, the user 12 highlights "meeting", "proposal" and "project". As the user 12 is highlighting these words on the display screen, the following may be spoken by the user: "Find meeting details." When this input is complete, the following is sent to the system 18 for processing: Text: meeting, proposal project; Speech-To-Text: "find meeting details."

The system 18 takes the input and attempts to locate the details of the meeting between the user 12 and the sender of the message, in this case "Robert". The system 18 accesses the calendar data by utilizing the calendar API that is published to developers for the calendar applications that are widely utilized in the marketplace. The details of the meeting are returned back to the user 12 from the system 18 (not depicted).

Figure 9:
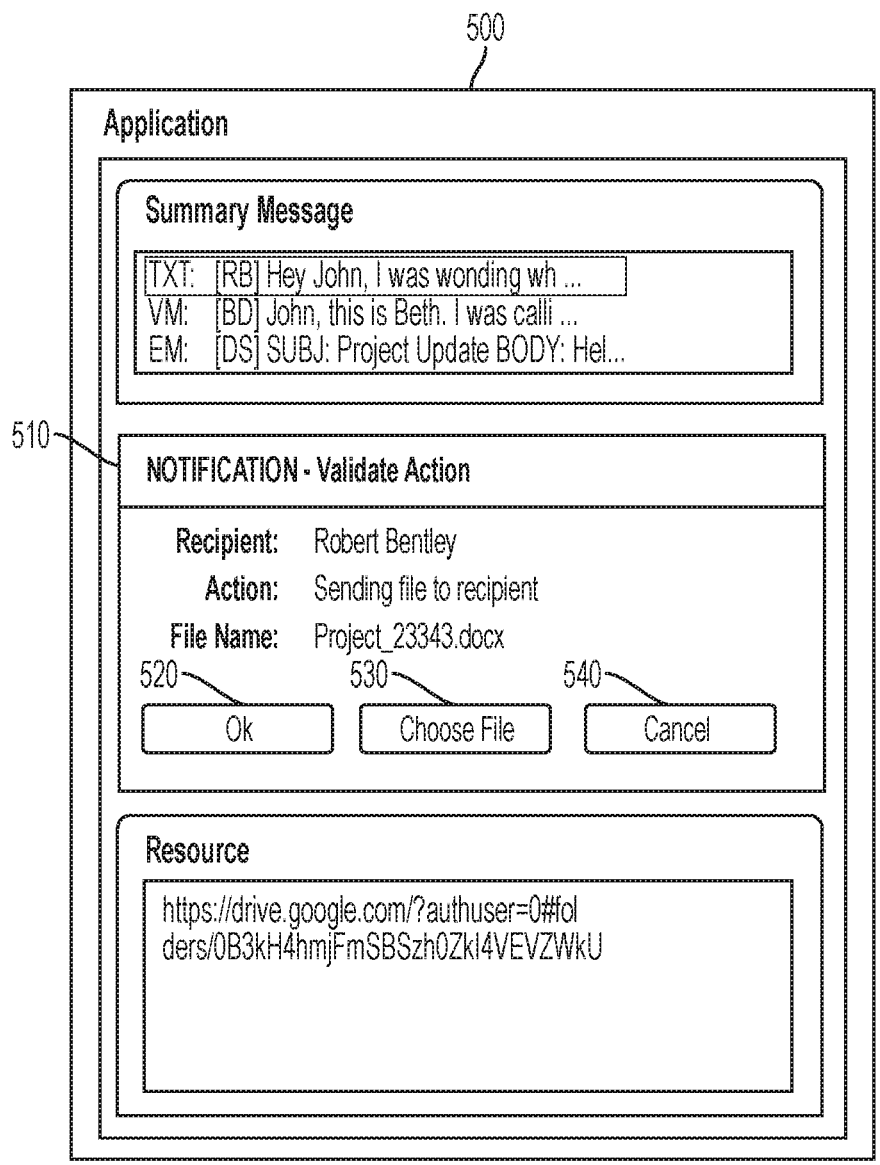
FIG. 9 illustrates an example user interface to identify data file notifications, according to example embodiments.

FIG. 9 illustrates a GUI window 500 with a notification window 510 displayed to the user when a "send file" action has been initiated. The notification window 510 is a different color to bring attention to the user. This window serves to validate the action that the application is initiating. In this case, the user has selected the word "project" and has either drug it to the "More" button or selected the text and pressed the "More" button as illustrated in FIG. 4. By selecting this action, the application locates the potential project file that the user and the contact have been corresponding about, and begins the functionality to send the file to the contact. The notification window 510 displays the appropriate information to inform the user of the pending action for validation. The recipient of the file transfer is listed as well as the pending action that will occur. The file that is being sent is also listed. The user has three options: select the "Ok" button 520, which will validate the recommendation by the application and either the actual file will be sent to the user or a link will be shipped. The notification window 510 will then close. The user can then select another file (not depicted) which may be the file that was actually requested (i.e. the proposal that was due on Friday) and/or a related or non-related file by selecting the "Choose File" button 530 so the application will open another overlying file selection window. The user can then browse the local (or remote) files and select the file of interest. The notification window 510 will close and the file will be sent, or a link to the file will be sent. The user can select the "Cancel" button 540 and the notification window 510 will close and no action will be performed. This functionality allows the user to interact with the application to validate the action that is being performed.

In an alternate embodiment, the user is able to edit the file that is selected to send to the recipient. In this embodiment, an "Edit" button (not depicted) will appear and when selected, the document is opened up for editing either in the current window, or a new window overlaid over the current window. The user can then save the file to the current device as well as the updated/edited file which is sent to the recipient.

If one or more of the received messages received reference a document/file/picture/video/etc., then that file (or link to the file) will be automatically sent to the contact without any interaction from the user. This allows the intuitive interaction and response from the system 18 without the user having to perform any actions. Once this interaction occurs, the system 18 notifies the user that a file was sent to provide the user with the option to communicate with the contact if necessary. This automatic interaction is possible since the system 18 has access to the user's local files through the previously configured authentication. The system 18 parses the message or converted message to text if the original data was an analog voicemail message, and seeks to determine any word that indicates a data file that may be accessible. If a reference is encountered that indicates the data file, then the system 18 will attempt to define the data file related to the user and the contact. This may be due to recent correspondence between the contact and the user through emails, SMS texts, or call logs.

If possible, the system 18 attempts to locate the referenced data file on the user's device and send either the actual file or a link to the file if accessible by the remote contact, for example, if the file is stored in the Network or "Cloud" and is shared by both parties. For example, it is assumed that one of the messages received by a contact was "Hey John, what is the status of the project document we've been working on." In this case, the system 18 parses the message and determines that the "project document" that the contact is referring to is the same document that the contact and the user have been collaborating on through both previous SMS texts and emails in past communications which have been transmitted, logged, and stored in memory. This is determined by the system 18 through accessing the user's SMS text history with that contact as well as emails between the user and the contact. Both the user and the contact make this access possible through the authentication functionality at the configuration of the application of the present application. Having determined where the project document is located, the system 18 returns a link to the most current version of the document from the user's point of view.

After sending a text message to the user the contact may receive a response with a link to the document. In the message sent by the system 18, the contact may understand that the user did not indeed send the message, but it was sent automatically by the system 18. The returned message sent by the user with an "Automatically Sent Message" indicator may be appended to the text message. The link is then clickable, allowing the contact to view the most recent document. Alternatively, the actual document may be sent by the system 18 to the contact, or upon receiving the above text message, it may be determined which file that the contact is referring to and the link to the document and/or the actual document may be sent without any interaction by the user. These intuitive actions may save time and energy by automatically answering questions from contacts without any interaction by the user.

Upon returning to the application, the user would be able to ascertain all activity that occurred while the user was away from the application. For example, if the above text message was received and the document was sent in response, the application would display a notification to the user indicating the course of action.

Figure 10:
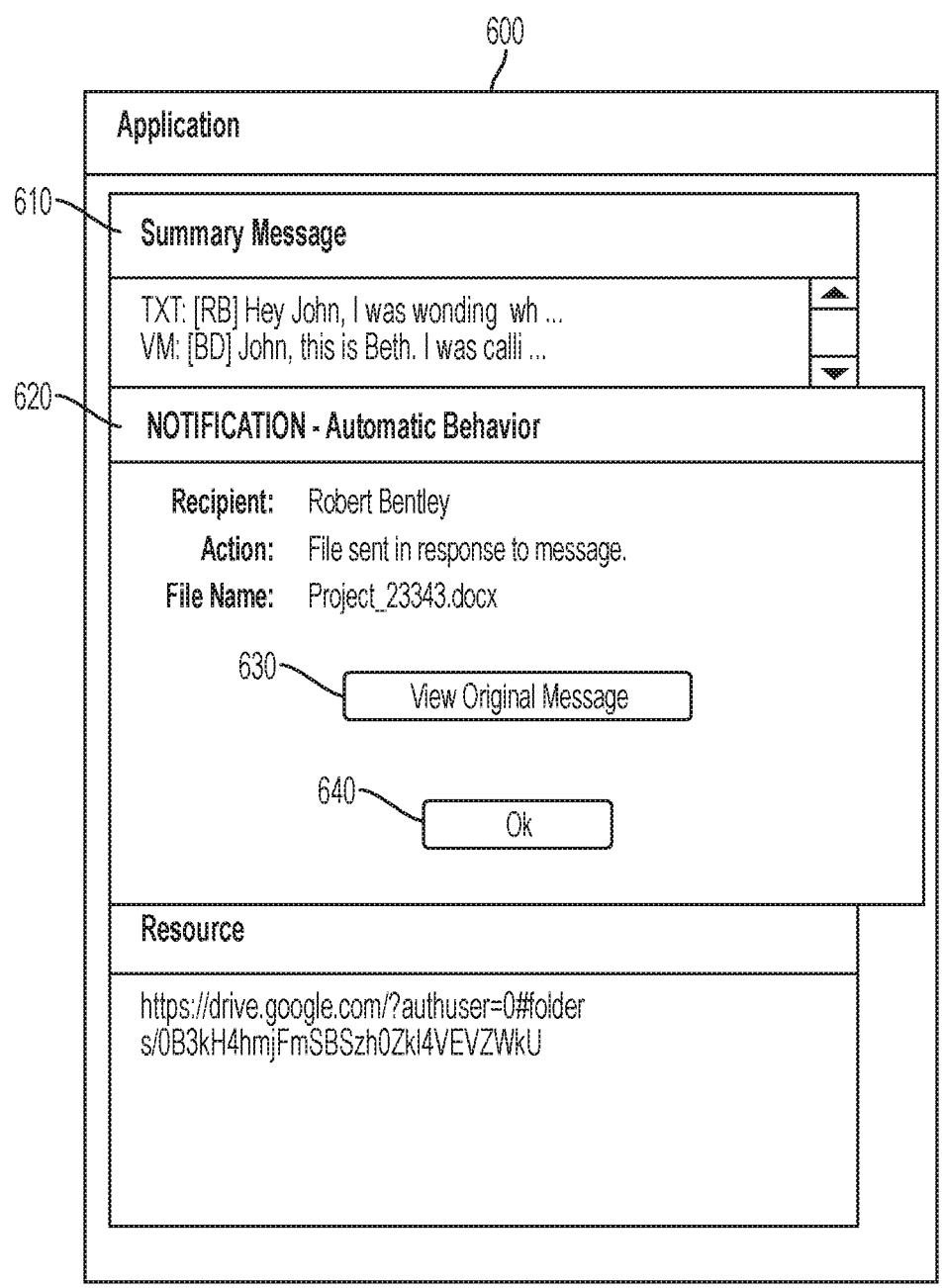
FIG. 10 illustrates another example user interface to identify data file notifications, according to example embodiments.

FIG. 10 illustrates a GUI depiction 600 that includes the application with the original panels 610. Overlaid on the GUI is a notification window 620. This notification is a different color to bring attention to the user. The notification window indicates in the title that it is notifying the user that an automatic behavior has occurred. The contents of the notification window indicate the recipient of the automatic behavior, the action that occurred, and the file name of the file that was involved in the action. The user has the option to press "View Original Message" 630 to see the message from the contact that began the functionality and press the "Ok" button 640 to dismiss the notification window.

In another example embodiment, once the system 18 locates the document referred to by the contact in the received message, the system may "crawl" through the document searching to locate the current status as referenced in the actual document. Many documents have a "Status" section listing a table that contains the status. The table may contain columns such as: Date, Author, and Description. The system 18 will return the last table row in the status table, as that will contain the latest status of the document. In a further embodiment, the current application may permit the configuration of the behavior when automatically sending files to remote contacts. If more than one automatic response was sent, the application displays the automatic responses as a separate window. The automatic response is possible since the user and the contacts have been pre-authorized in the configuration of the application. Through authorization, it is possible to access specific portions of each of the user's data.

The summary of the automatic notifications permits the user to understand what automatic actions by the system 18 occurred during the user's absence as well as how to take corrective actions on incomplete actions such that the system 18 was not able to complete due to a lack of information. There are many reasons that the system 18 is unable to complete an action. The system 18 may not be able to determine the exact file (e.g., document, image, video, etc.) that the contact is referring to or the contact may not be previously authenticated by the system 18 disallowing any access to personal information as well as other various issues. This document will attempt to document the possible scenarios leading to the system 18 unable to complete an action, but one versed in current programming techniques will be able to easily ascertain other scenarios that may attribute to the system 18 being unable to automatically respond without deviating from the scope of the present application.

Upon activating (or reactivating) the application, the user will receive a summary message if the user had previously configured a timeframe when the user would be unavailable to respond to messages. In addition to a summary of all messages that were received, there is also a window that depicts a summary of the automatic behavior from the system 18 that may have occurred.

Figure 11:
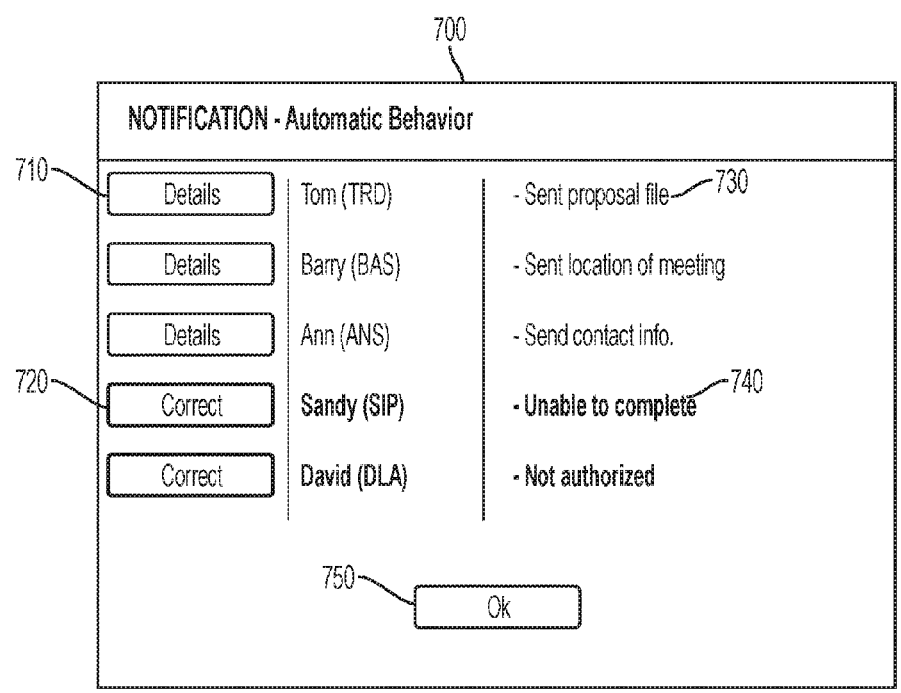
FIG. 11 illustrates an example user interface to confirm notification messages and corresponding behavior, according to example embodiments.

FIG. 11 illustrates a window 700 that is displayed by the application when the system 18 has performed an automatic behavior, response, action, etc. In this example, there are 5 automatic responses that may have been sent by the system 18 while the user of the application was away. Each response is listed as a row in the window 710. The first element in the row is a button 710 that, when pressed, expands the details of the automatic response (see FIG. 9 for an example of the contents of the window that is overlaid on the current window). This window displays a summary of the automatic notifications that have been sent. The second element is the first name and initials of the recipient of the automatic message. The third element in the row is a summary of the action that was taken by the application 730.

In the first row of display window 700, the system 18 may have sent a proposal file to 'Tom'. This may have been a result of Tom sending a message to the user referencing a proposal. The system 18 automatically determined that the proposal is a shared file between the user and Tom due to previously documented communication (or another previously discussed method) through email, voicemails, SMS text, etc. The system 18 automatically sent the proposal file to the recipient (Tom, in this case) in response to the query from Tom. When received, the message appends "Automatic Response" so the recipient will understand that the message is from the system 18 and not the user.

The second row of display window 700 provides an automatic response sent to 'Barry' indicating the location of the meeting. In this example, a message from Barry would have been received requesting the location of an upcoming meeting. The system 18, understanding the question through parsing the message, is able to ascertain the specifics of an upcoming meeting by having access to the user's calendar through previously configured authentication, and understanding that a meeting found on the user's calendar that has Barry as an attendee of the meeting would be the meeting that Barry is referencing. This access is made possible through APIs that current calendar applications publish for software developers to use in programming interfaces to their functionality. Through the use of the APIs, the system 18 queries the calendar and can encounter a possible meeting that the contact is referencing. When pressing the "Details" button 710, another window is placed above with the details of what was automatically sent. In this example, the window will display the specific meeting contents that were sent to the recipient. There is a "View Original Message" button that permits the user to determine if the meeting details were indeed the correct meeting referred to by the contact. The user would also have the option to initiate a message to send to the user from this window (not depicted).

The third row of display window 700 provides an automatic message that was sent by the application in reference to Ann (a contact of the user). The message is contact information of the user in response to a message that was received wherein Ann was asking for any specific contact information from the user. The user has the option to press the "Details" button 710 and a window is displayed (See FIG. 10 "Notification Of An Automatically Sent File") that lists the details of the automatic message that was sent. The user also has the option to obtain the exact message from the user from that window and contact the recipient as well to clear up or further provide additional information as needed.

The fourth row of display 700 is a window sample of an automatic response what was unable to be completed. In other words, the system 18 attempted to provide an automatic response but for a particular reason (or reasons) was not able to comply. The user has the option to press the "Correct" button 720 to have the application respond with another window allowing the user to obtain an understanding of the cause of the problem. The system 18 may have many different reasons for not being able to complete an automatic response. This document will attempt to document many of the scenarios that may cause this to occur, but one versed in current programming practices will easily be able to determine many different situations that will cause this action without deviating from the scope of the present application. The fifth and last row of 700 is a sample of an automatic response that the system 18 may have been able to complete, but the recipient was not an authorized user of the system 18. The "Correct" button 720 can be pressed by the user allowing another window to be overlaid on this window so the user can initiate a message to the recipient. The user may inform the recipient that if he/she becomes an authorized user, automatic messages may be sent and more intuitive communication can occur without the interaction of the user. Lastly, the user can press the "Ok" button 750 removing the window from the stage.

As another example, the user may receive a text from a contact with the following content: "Hey Bob, what time is the meeting on Thursday?" The system 18 having received this message parses through the message and attempts to return a message to the contact to answer the question without the user's interaction. In this example, the system 18 concentrates on the words of importance in the text, such as "time", "meeting" and "Thursday". The system 18 then utilizes APIs from the calendar application that the user has on the device to query any events that are currently scheduled on Thursday of the current week. The system 18 then returns to the contact (automatically) the standing events that the user has on that Thursday. Preceding the listed events in the message is the text: "This message is automatically generated", allowing the contact to understand that the user indeed did not send the message.

Figure 12:
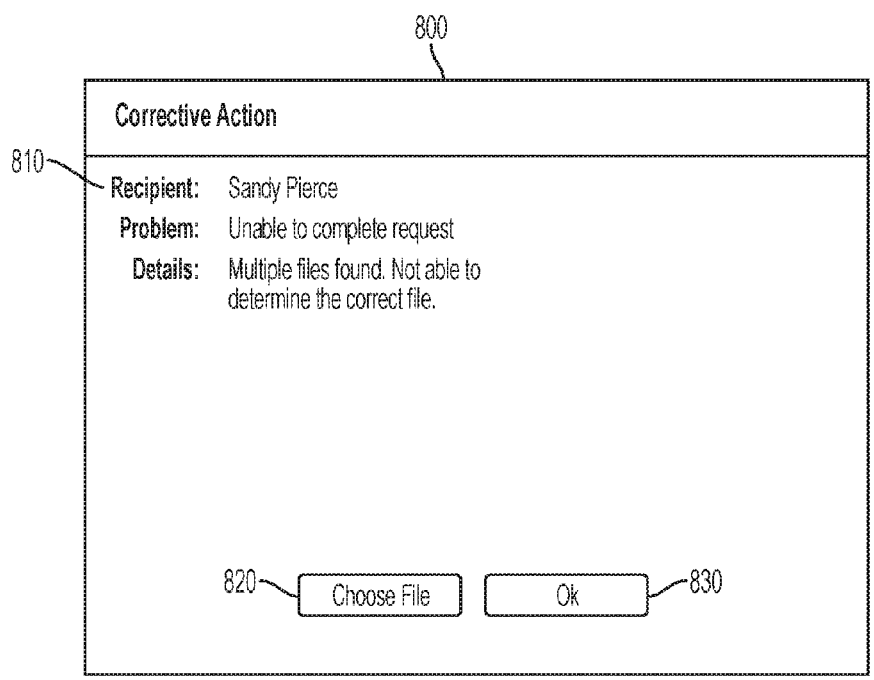
FIG. 12 illustrates an example user interface to confirm corrective action and corresponding details, according to example embodiments.

FIG. 12 depicts a "Corrective Action" window 800 that is displayed when the user selects the "Correct" button 720 from the "Notification—Automatic Behavior" window 700 of FIG. 11. The window displays a sample scenario where the application was unable to determine the correct file to send to the recipient. There are other scenarios that can be depicted here pertaining to many different issues what can arise when the system 18 is unable to functionally decide on the correct response to send to an incoming message. One versed in programming techniques will easily be able to determine other scenarios and solutions without deviating from the scope of the present application.

The window lists the details from the system 18 pertaining to the scenario that caused the corrective action 810. The recipient is listed along with details of the message. The problem is listed next indicating the issue that the system 18 encountered causing the issue for the corrective action. The details of the problem are then listed as well. In this case, the system 18 encountered multiple possible files that could pertain to the mentioned file by the recipient. Because the system 18 was unable to determine the file that the recipient was referencing, a corrective action was necessary.

There are buttons or items for user selection on the bottom portion of the display screen that allow the user to interact with the application to gain further details as well as solve the issue causing the corrective action. The "choose file" button 820 allows the user to choose the file of interest. This information may be necessary to allow the user to gain an understanding of the correspondence between him/her and the recipient. When this button is pressed, a new window is opened and overlaid over the current corrective action window. The "ok" button 830 allows the user to dismiss the corrective action display screen.

The choose file button 820 may allow the user to select the correct file that pertains to the request from the recipient. When pressed, another window is displayed over the current corrective action window. This window (not depicted) shows the two or more files that the system 18 encountered when searching for the file related to the recipient's message. The user then has the option to choose one of the files or select a completely different file. Once the file is selected, there is a button on the bottom entitled "Send Message" so a message creation window is displayed allowing the user to send a message to the recipient. The newly selected file will be attached to the message. In another example embodiment of the current application, the user has the option to send the file via email instead of embedding it in the SMS text message. Lastly, the "Ok" button 830 closes out the window when pressed. As mentioned previously, many different corrective actions can be uncovered wherein the system 18 has issues performing automatic responses to recipient messages.

Figure 13:
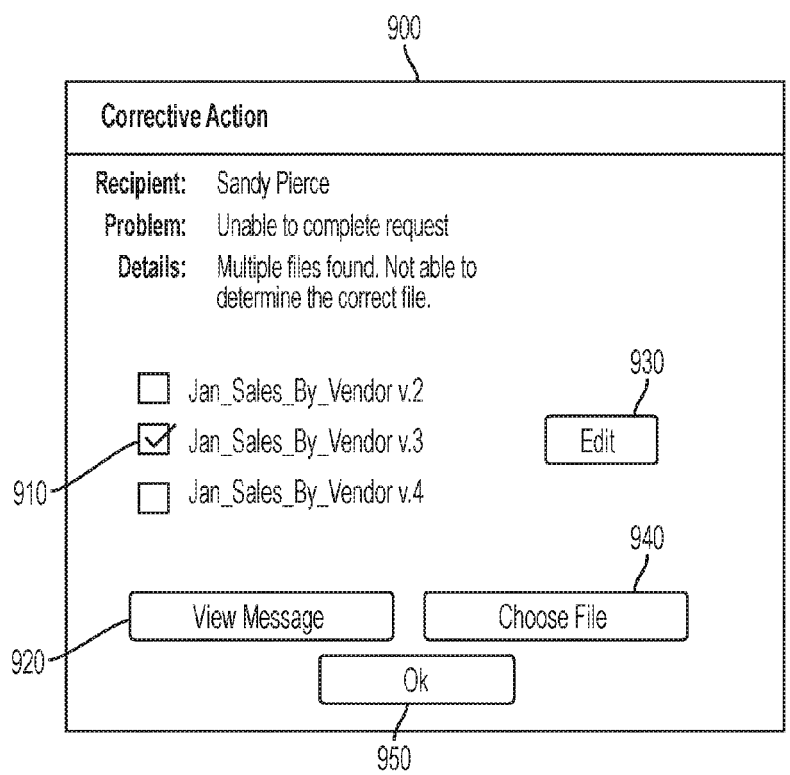
FIG. 13 illustrates another example user interface to confirm corrective action and corresponding data file options, according to example embodiments.

FIG. 13 illustrates a GUI depiction of the corrective action window of FIG. 12 in further detail. Referring to FIG. 13, the GUI may permit more functionality for the user of the application 900. In this example, the recipient is "Sandy Pierce" and the issue is that the system 18 was unable to determine which file she was referencing. Three files were encountered that reflect the file referenced 910. The user of the application has the ability to either choose one of the listed files 910, or choose an entirely new file by clicking the "Choose File" button 940. When the "Choose File" button 940 is pressed, the system 18 opens up a "File Chooser" window (not depicted) so the user is able to select a file and have it sent to the recipient.

The user is also able to view the original message from the recipient by clicking the "View Message" option 920. This may be necessary to allow the user to obtain context as to the original recipients communication. When a particular file is selected, the system 18 adds an "Edit" button next to the chosen file 930. This button, when pressed, opens up the file to be edited by the user. The document will be opened up for editing either in the current window (by expanding the window, or in another editing window that is overlaid over the current GUI window.

In another example embodiment, the user is able to edit multiple files through this same interface, and the GUI will have "Edit" buttons 930 next to each of the selected files (not depicted). The user of the application can edit these files whether or not he/she is sending the file(s) to the recipient who sent the original message request. When editing the file(s), a similar area in another file, which is one of the files that is listed and/or a different file that is updated and can be sent. For example, the user updates a milestone being hit in the current project in the file that will be sent to Sandy, but this information is also updated in other files that have a similar area. These other files may be a project manager's file that is tracking progress of the particular project, a CTO's file, or any other file. Also, just the portion of the edited file that was updated may be sent back in the same medium as was originally utilized by the recipient. For example, if Sandy originally sent an email, just the portion that was updated by the user can be sent in the body of the email and the complete file can be attached to the outgoing email. If Sandy originally sent a text message, just the portion of the edited file that was updated can be sent via text and the complete file can be sent as an attachment to the text or attached to a separate email sent simultaneously with the outgoing text, or a link to the complete file can be provided in the text message. One versed in current application programming techniques can easily discover other functionality that can be implemented in the application without deviating from the scope of the present application.

To further depict the communication between the network elements, descriptions of the message flows are included that will highlight the communication flow occurring when the user both configures the application and when the actual queuing and summary messages are sent to the user.

Figure 14:
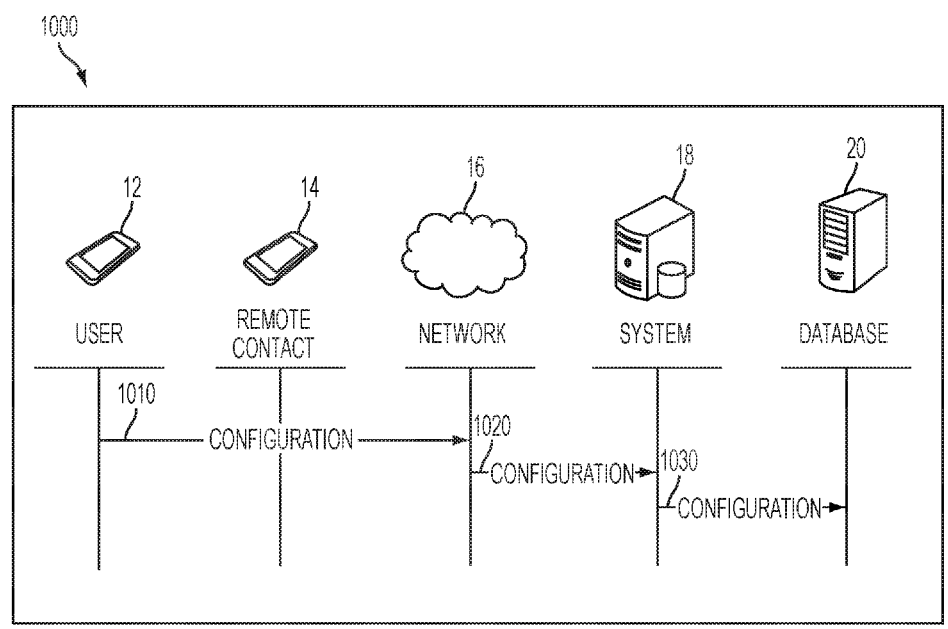
FIG. 14 illustrates an example communication signaling diagram of a message flow through the various computing devices and corresponding networks, according to example embodiments.

In FIG. 14, the configuration 1000 illustrates a first message flow that includes the communication between the elements in the network. The user of the application 12 has the application of the present application running on the user's wireless device 12. The remote contact 14 is a current recipient in the user's contact list that has been authenticated as another user in the system 18. Although one remote contact 14 is depicted, it is appreciated that many remote contacts are probable in the system 18. The network 16 is the global Internet or World Wide Web. The system 18 is the networked connected device that communicates with the user 12 and can be remotely connected to a database 20 through the network 16.

The user 12 configures the application of the present application. This operation includes configuring the event (or events) and the specification of who can pass through the filter during the events. This configuration enables the user to determine how the automatic behavior is performed and where the data files are sent. Once the user 12 has configured the application, the configuration data 1010 is sent to the network 16 and routed 1020 to the system 18, which can store the configuration in the database 20 by sending the configuration data 1030 to the database 20.

Figure 15:
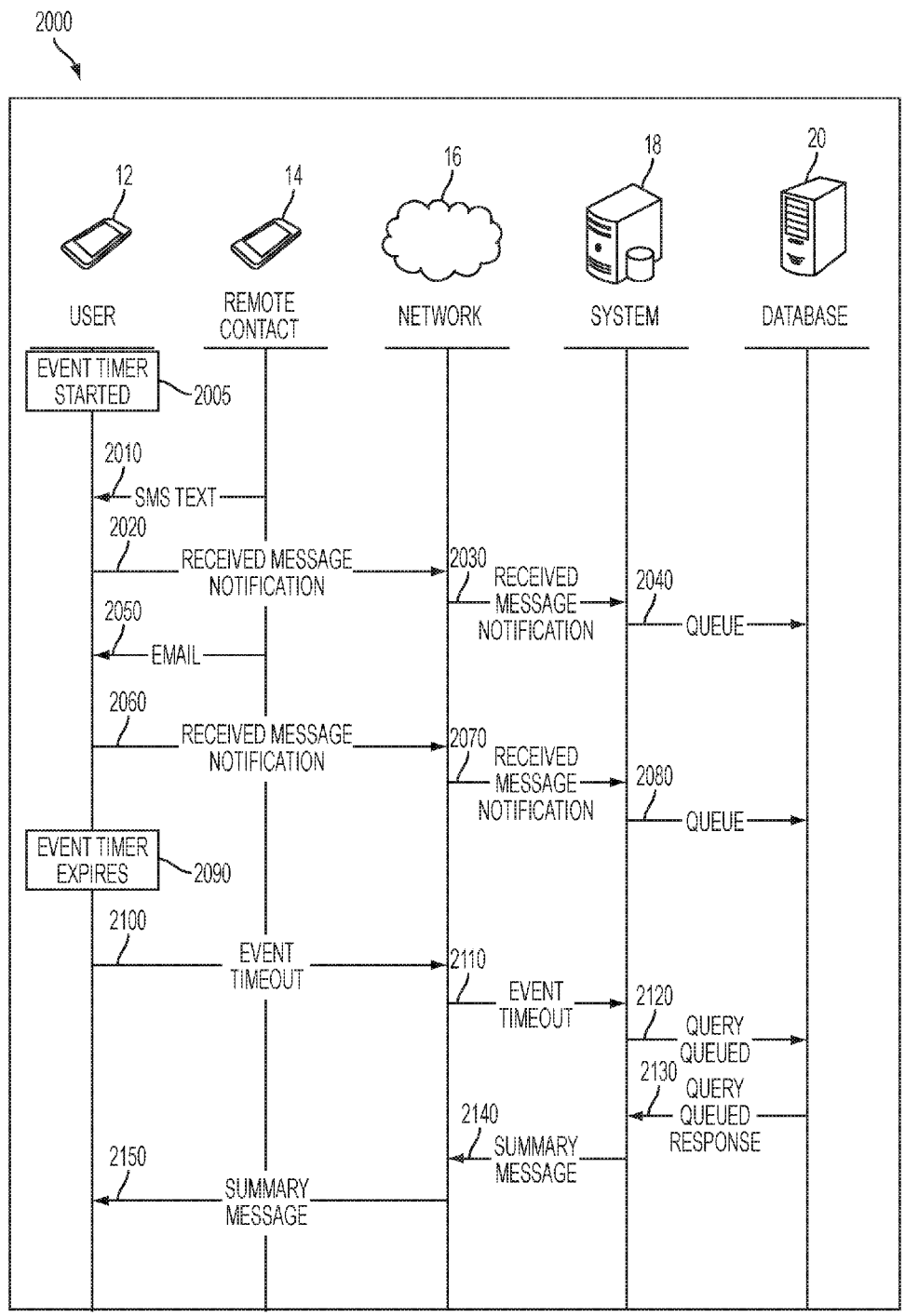
FIG. 15 illustrates another example communication signaling diagram of a message flow through the various computing devices and corresponding networks with additional message details, according to example embodiments.

In FIG. 15, a more detailed message flow is depicted 2000 that follows the communication between the network elements when messages are queued by the system 18 and/or when the system 18 sends a summary message to the user. In this example, the user of the application 12 has the application of the present application operating on the device. The remote contact 14 is a current recipient in the user's contact list that has been authenticated as another user in the system 18. Although one remote contact 14 is depicted, it is appreciated that many remote contacts are probable in the system 18. The network 16 is the global Internet or World Wide Web. The system 18 is the networked connected device that communicates with the user 12 and can be remotely connected to a database 20 through the network 16.

The application having previously been configured by the user 12 is activated and it is understood that the message flow reflects a period of time so the application determines that the flow occurs during an active event as configured by the user 12. The application starts a timer 2005 or "Event Timer" that runs for the extent of time previously configured by the user 12 so the received messages that are filtered are queued. The remote contact 14 sends an SMS text message 2010 to the user 12. The application executing on the user's device 12 determines that the user 12 should not be notified of the message, as that remote contact 14 is not previously configured as an exception. Therefore, the application on the user's device 12 sends a received message notification message 2020/2030 to the system 18 through the network 16 to be queued. The system 18 sends a queue message 2040 to the database 20.

The remote contact 14 also sends an email message 2050 to the user 12. The application executing on the user's device 12 determines that the user 12 should not be notified of the message, as that remote contact 14 is not previously configured as an exception. Therefore, the application on the user's device 12 sends a received message notification message 2060/2070 to the system 18 through the network 16 to be queued and a queue message 2080 is sent to the database 20 where the message is queued.

The event timer on the user's device 12 expires 2090 indicating that the system 18 should send a summary message to the user for any queued messages that have been received during the event. The event timeout message 2100 is sent to the system 18 through the network 16. When the system 18 receives the event timeout message 2100/2110, it queries the database 20 to obtain any queued messages by sending a query queued message 2120. The database 20 returns with a query queued response message 2130 back to the system 18, which then formulates a summary message and sends it 2140 to the user 12 through the network 16. The application on the user's device 12 then displays the summary message 2150 to the user so the user 12 can then obtain further details of the recipient(s) that sent messages during the pre-configured event.

According to alternative embodiments of the present application, many mobile wireless devices include an accelerometer as a hardware sensor used to detect motion of the device in various directions. Applications operating on the device can utilize published functions that allow the monitoring of the accelerometer. For example, the 'onSensorChanged( )' event is triggered when the accelerometer experiences a change. By handling this event, the programmer can retrieve values and changed values from the accelerometer to functionally determine whether the device is moving side-to-side, moving upward, or moving downward. Also the rate and the delta time can be determined as well. Furthermore, when interfacing with the accelerometer, there are three values that are useful to know including 'X'=Roll. The 'X' value corresponds to a roll or rotation around the axis that extends from the home button to the earpiece of the mobile device. Values vary from 0.5 (rolled to the left) to −0.5 (rolled to the right). Another value is 'Y'=Pitch, which is the rotation around an imaginary line that runs from the top of the device to ½ way down the screen. Values vary from 0.5 the top of the phone straight down to 0.5 (the top of the phone straight up). Another value is 'Z'=Facedown/ Face up. This value indicates whether the mobile device is face up (−0.5) or face down (0.5). When the device is placed on either of its sides, the value of Z is 0 (zero). Together, the X, Y, and Z values create a 3-D representation of an acceleration vector to indicate the direction of gravity working on the device.

Figure 16:
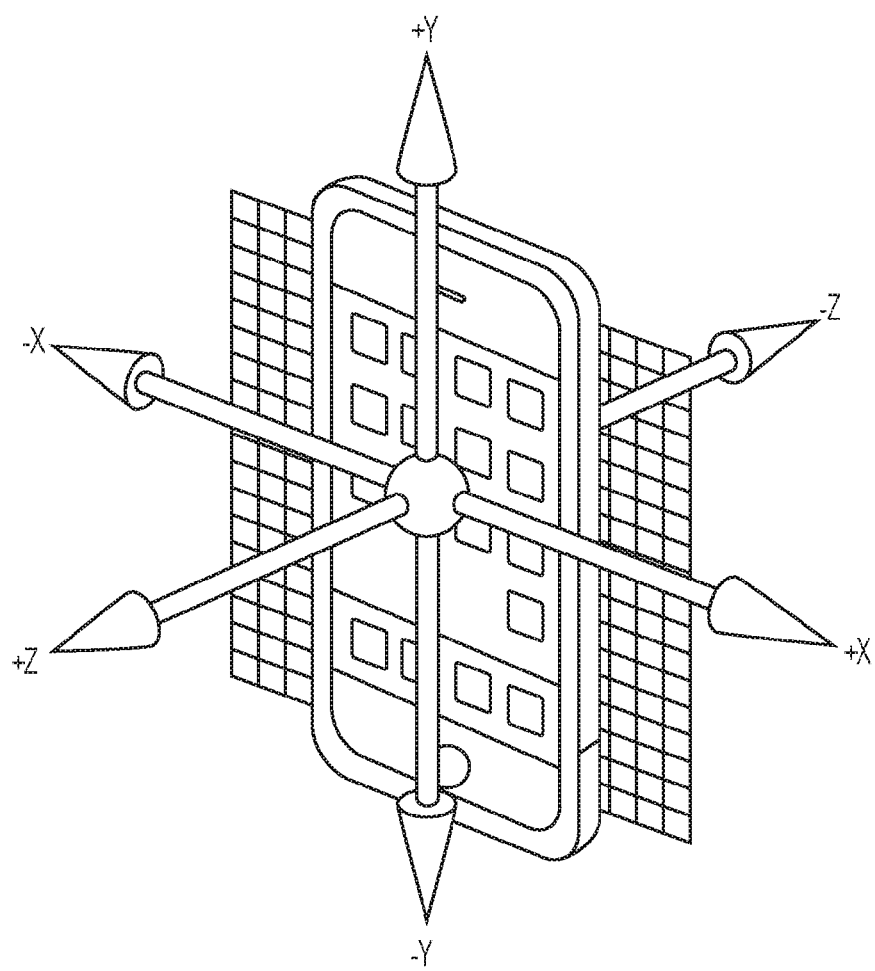
FIG. 16 illustrates an example gyroscope configuration for a mobile station, according to example embodiments.

FIG. 16 illustrates the X, Y and Z vectors of movement of the wireless device. By using the 'onSensorChanged( )' method (or a similar method), the programmer has the ability to determine the motion of the mobile device and allow the state of the executing program to execute accordingly. The bringing of the mobile device up to the face from a lower starting point triggers the device to understand that the user is raising the phone to speak. Consequently, lowering the phone from the face signifies to the mobile device that the user is no longer communicating. The use of the accelerometer threshold values is useful in determining, intuitively, the actions of the user. Furthermore, the use of monitoring threshold values of the mobile device can be programmatically designed to intuitively allow the application to change the state of the functionality once the user of the device learns the actions necessary to trigger the state change. For example, if the user raises and lowers the device within a period of time, the application executing on the mobile device can accept this alteration of the accelerometer threshold values as a state change and functionally perform as a different code path.

In a further embodiment of the current application, the user is able to perform a shaking of the phone to dictate a state change in the application. Programmatically, one implementation of this follows:

```
static  BOOL  L0AccelerationIsShaking(UIAcceleration*
last, UIAcceleration* current, double threshold) {
  double
  deltaX=fabs(last.x−current.x),
  deltaY=fabs(last.y−current.y),
  deltaZ=fabs(last.z−current.z);
  return
  (deltaX>threshold && deltaY>threshold)||
  (deltaX>threshold && deltaZ>threshold)||
  (deltaY>threshold && deltaZ>threshold);
}
@interface L0AppDelegate:NSObject <UIApplicationDelegate> {
  BOOL histeresisExcited;
  UIAcceleration* lastAcceleration;
}
@property(retain) UIAcceleration* lastAcceleration;
@end
@implementation L0AppDelegate
  (void)applicationDidFinishLaunching:(UIApplication *)
    application {[UIAccelerometer sharedAccelerometer].
    delegate=self;
}
  (void) accelerometer:(UIAccelerometer *)accelerometer
    didAccelerate:(UIAcceleration *)acceleration {
  if (self.lastAcceleration) {
    if (!histeresisExcited && L0AccelerationIsShaking
      (self.lastAcceleration, acceleration, 0.7)) {
      histeresisExcited=YES;
      /* The user has performed the shaking action successfully */
    }  else  if  (histeresisExcited  &&
      !L0AccelerationIsShaking(self.lastAcceleration,
      acceleration, 0.2)) {
      histeresisExcited=NO;
    }
  }
  selflastAcceleration=acceleration;
}
@end.
```

In FIG. 17, the example computer code for detecting changes in the accelerometer is illustrated in detail.

The hysteresis permits the program to prevent the shaking event from triggering multiple times until the user stops the shake. In this implementation, the coding of the state change to initiate the summary message would take place in the commented line: /* The user has performed the shaking action successfully */. For example, the user 12 would have initiated an event where all messages are being filtered. In this example, the user has selected a date, a beginning and an ending time for the event, as well as specified any exceptions to the filtering. When the user has completed the event the user will then desire to receive the pending summary message at that time even though the timer would not have expired. For example, the meeting that the user 12 was attending may have let out earlier than expected.

To communicate with the application running the user's mobile device 12, the user initiates a shaking action of the device from left to right. The application identifies the X, Y and Z value changes from the accelerometer and programmatically changes the state of the executing application. The application then queries the system 18 for the summary message. The querying of the system 18 is functionally similar to the event timeout message 2100/2110, but instead of the event timer expiring 2090, the shaking of the phone expired the timer instantly. The system 18 then responds with the summary message 2140/2150 and the summary message is displayed to the user 12 in the application.

In another example embodiment of the present application, the user can shake the mobile device to enable other types of functionality in the application. For example, by shaking the mobile device, the application can be programmed to execute the application of the present application. Other commands can be programmed that allow various functionalities through the shaking of the device. Also, specific functionalities are performed to identify the movement of the device in a certain manner which is identified by the application, and depending on the movement of the device, additional functionalities are performed. For example, if the user tilts the top of the mobile device forward, changing the position of Y and Z axis', the application can perform a specific function.

As an example of one implementation of this functionality, it is assumed that the user is viewing the summary message after the timer has expired. A forward tilt of the top of the mobile device towards the user can indicate that the user desires to filter all of the SMS text messages contained in the summary message. The application responds by redrawing the GUI window containing all of the summary messages with only the SMS text messages contained in the summary message. The user can then tilt the top of the mobile device away from him/her to "undo" the filtering of the summary message and the application responds with redrawing the GUI display, displaying the summary message in its entirety. These examples serve only to depict two of the many possible movements of the mobile device and associated changes to the application. One versed in current mobile device programming will easily be able to determine many more movements along the X, Y, and Z axis' along with many different changes to the application without deviating from the scope of the present application.

When the user 12 has configured an event, and during the event, all messages incoming to the user will be filtered and stored in the system 18 to be delivered to the user 12 when either the timer expires, or when the user 12 prompts the system 18 to deliver the messages prior to the expiring of the timer. In another embodiment of the present application, additional functionality allows the user to interact with incoming messages that were not filtered during the configured event. For example, assuming that the user has a meeting and has preconfigured the application to filter out some messages incoming to the mobile device during the event based on a predefined timeframe. Then the user has also allowed some messages for one or more contacts to not be filtered by allowing these contact(s) in the "exception list" 240 when configuring the event in the configuration of the event in the application. Assuming that a message or messages that were not filtered are delivered to the user's mobile device 12 during the configured event, functionality in the application of the present application permits the user to interact with the mobile device to handle the incoming, unfiltered message(s). When the user is notified by the mobile device that a message is delivered, functionality in the application permits the user to take an action, such as to simply press the side of his/her first against the touch screen (henceforth referred to as a "Fist Press") to communicate with the application. This touch on the touch screen of the mobile device may be interpreted by the application and cause the application to automatically respond to the message in a predetermined format.

In this example, the user performs a "Fist Press" on the screen that is unlike any other general touch on the screen. When the application receives a notification from the mobile device that the touch screen has been touched with this specific pattern, specific functionality is in place in the application to perform a specific code path. The user only has to perform the "Fist Press" on the touch screen without needing to interact with the device in any other way. Therefore, the user does not need to take his/her attention away from the event (in this case a meeting) and attend to the mobile device, but only touch the screen in a specific pattern. By performing a "Fist Press" on the screen when an unfiltered message has been delivered, the application responds by automatically responding to the message in a predefined manner.

When the message is successfully sent by the application, feedback is presented to the user informing him/her that the message has been sent. This optional notification can be any of a flashing light on the mobile device, a sound from the mobile device, and/or a vibration of the mobile device. The user in the configuration window of the current application configures the particular type of feedback as desired. This feedback permits the user to understand that the message was successfully sent in response to the incoming message. The particular pattern presented to the touch screen of the mobile device can be programmed differently. The above example depicts a particular pattern (a "fist press"). One versed in current mobile programming techniques can easily determine other patterns so the application can respond with the change of state in the application without deviating from the scope of the present application.

In yet another embodiment of the present application, the user can allow interaction of incoming messages to the mobile device during an event. This modification of handling messages is made in the configuration of the event (not depicted). For example, the user may permit all messages to be delivered to him/her during a preconfigured event. If a message is delivered to the user's mobile device and the message is not interacted with, the message is then stored in the system 18 to be delivered at a later time in the summary message. If a message is delivered and the user makes a "Fist Press" on the touch screen of the mobile device, the application automatically responds to the message. In this example, the user can set the mobile device to be vibrated upon notification of incoming messages and not causing a distraction during an event, for example, a meeting. If the user, after reading the incoming message, ignores the message, the user understands that it will be later delivered in the summary message and can interact with the message at that time. The particular pattern presented to the touch screen of the mobile device can be programmed differently. The above example depicts a particular pattern (a "fist press"). One versed in current mobile programming techniques can easily determine other patterns so the application can respond with the change of state in the application without deviating from the scope of the present application.

Upon a timeout of an event, or earlier, the user 12 may desire to receive a summary message. This summary message will contain the filtered messages that were not delivered to the user 12, but stored in the system 18. By configuring the application of the present application to send the summary message when the user 12 performs a predetermined action, the application becomes more intuitive, and thus more robust. It is therefore determined that upon notification to the application that the user 12 has raised the mobile device to the ear area, the summary message will be delivered to the user 12. The summary message will be converted to speech and audio will be spoken to the user 12. The elements of the summary message delivered to the user through the text-to-speech can be a summary of all of the types of messages received, a small part of each of the messages that were received, and/or the entire contents of all of the messages that were received during the configured event. This exact type of information delivered to the user through the text-to-speech is configured by the user 12 in the configuration portion of the application (not depicted).

According to example embodiments of the present invention, when a user desires to begin speaking into a mobile device, the device is normally brought to the side of the head and normally a slight ear press against the middle ear area is performed against at least a portion of the device. This ear press against the human ear is regular enough in normal mobile device users that it can be utilized among other executions to initiate the state change allowing for speech recognition (e.g., answering a call, etc.). This action is normally made by all users of mobile device and is seen as a normal physical action reflecting the user's desire to begin speaking and/or listening interactions with the mobile device.

The ear press may be recorded by the mobile device's sensors, which are commonly included in many smartphones. These sensors can include, but are not limited to: gyroscopes, accelerometers, compasses, etc. The action of a user moving the device up to the ear is distinguished enough to allow the device to ascertain with a relatively high amount of accuracy to switch to the speech state from a first state, such as an idle state, a ringing state, a standby state, etc.

In general, there are two expected actions occurring when a user brings the phone up to their ear. The first action is the raising of the phone or a movement of the phone from a first relative location to a second separate location ending with an abrupt stopping when the device reaches the ear. Another expected action is a small and slight bouncing effect when the phone reaches the ear against the touch screen surface of the mobile device. Focusing on the ear touch example, it is understood that this small bouncing effect is necessary for the user to feel that the device has been brought up to the ear area. In a rare condition, the user may stop the device without the small bump of the device, but this is not the normal behavior when bringing the device up to the ear for speech communication. If one closely examines this movement, there are no other natural movements of the device indicating that the user desires to begin speech input to the device. It is therefore the assumption that if the natural movement of bringing the device to the ear is understood and recorded via the sensor in the device, then the needed state change to the speech state may occur. Certain thresholds are allowed that, when exceeded, indicate the precise motion reflecting an ear press when a user raises the mobile device to begin the speech interaction. The detailed description below will describe how the changes to the sensors' data are analyzed and when to determine if a state change has occurred.

When bringing the phone up to the user's ear area, there is a small stopping of the movement followed by a small bouncing effect of the device against the ear area. The bouncing effect may include an initial touching against the ear, a re-touching against the ear, and/or a sliding from one portion of the touch screen against the ear to a second portion of the touch screen against the ear, etc. The 'bouncing effect' will be either in a vertical or lateral plane in relation to the initial movement of the device.

Figure 18:
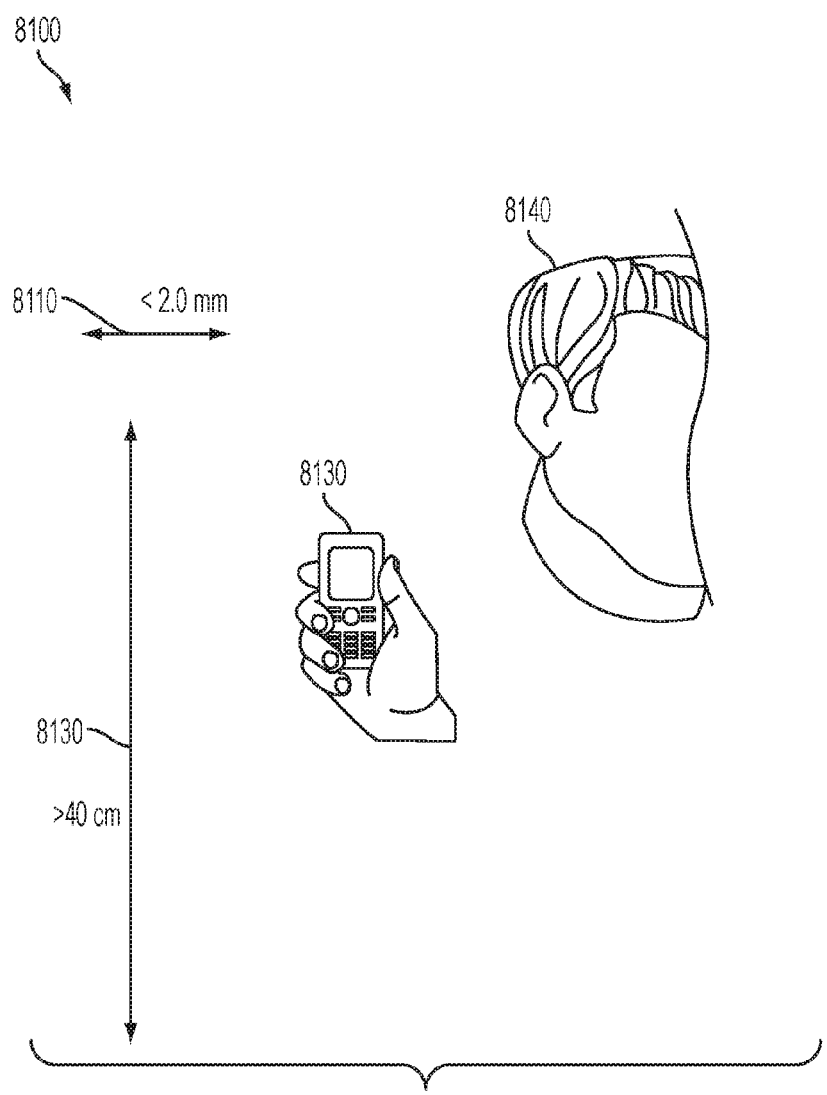
FIG. 18 illustrates an example user initiated mobile station movement diagram of the measurements and corresponding user actions performed to the mobile station, according to example embodiments.

FIG. 18 illustrates the motion of a mobile device used to indicate to the application that a state change to the speech state is appropriate 8100. In FIG. 18, the user of the device 8140 is holding the mobile device 8130. The device is executing an application associated with the present application. The movement of the device towards the user's head, for example, the Y axis 8120 would require movement above a minimum measured distance threshold, for example, 40 cm, referred to hereinafter as the "first movement." Another movement may be identified and require to establish a state change, such as the movement of the device once the device is near the user's ear 8140 would be in other direction(s). For example, the movement of the device may be in the X and/or Z axis movement directions and not to exceed a measured distance, for example, 2.0 mm 8110, hereinafter referred to as the "second movement" compared to a maximum threshold distance.

It is understood that the movement would not necessarily be in a vertical (first movement) and horizontal (second movement) direction, but the movement may be in other planes. For example, if the user is laying down and then brings the device towards the head. Also to consider, is the precise definition of the movement of the device upon or near the ear portion of the head. The motion of the device changes direction once the device nears this area of the user's body. The motion of the device may not be perpendicular to the initial movement, but it is noted that the change in direction for a length not to exceed 2.0 mm may be identified. This direction may indeed be in a perpendicular direction, but not necessarily. Also noted is the movement of the device in a different direction for a length not to exceed 2.0 mm.

Also noted is the understanding that the movement 8110 is made within a fluid timeframe. In more explanatory terms, both movements 8110 and 8120 are made in a single fluid motion. When designing the application to observe the data from the sensor, it is necessary to understand that a time period must be observed to determine how the second movement is related to the first movement. This time period will allow the application to understand that the second movement is indeed related to the first movement and corresponds to the user bringing the device to the ear and the state change to speech state is appropriate. This time period more accurately assures that the movement of the device is indeed the same movement to enable speech state change. For example only, it is understood that the second movement should begin not more than 20/40/60 milliseconds once the first movement is complete. Other time frames to consider are the entire movement time frame used as a time threshold basis for all movements related to call answering operations (e.g., 1, 2, 3 seconds).

The examples of the present application support identification of changes to the sensor(s) included in the mobile device. For example, the accelerometer and data from the sensor(s) are normally reported to the application for processing. For example, in object oriented programming, by utilizing the 'UIAccelerometer' object, a programmer is able to receive values from the accelerometer hardware as the object updates through the use of the 'UIAccelerometerDelegate' protocol, which is a single method for receiving acceleration data from the mobile device. This is a system level method implemented in the operating system running on the mobile device. In a sample pseudocode, the values of the accelerometer are displayed, but one versed in mobile application programming will easily be able to understand the interactions of the accelerometer data and utilize it according to the embodiments of the present application. The application, once receiving the sensor data, can monitor the data for changes that reflect the movement of the device.

Of particular note is the movement of the device upon nearing the user's ear. Understanding that the accelerometer records the data on three different planes (X, Y and Z planes), the data input to the application from the sensor will reflect a change in the movement of the device for a short period of time after the device has travelled for a distance greater than 40 cm, for example. This small indication is assists with the understanding of the exact nature of the movement of the device when the user has placed the device near the ear for speech input.

In the present application, the device is being "bumped" against another object, but the other object is a human ear, not another device. The present application does not need to understand the exact movement of the mobile device, but that a "bump" has occurred. Therefore, it is not necessary to understand either the speed of the moving device or the movement of the device at all before "bumping" into the other device. The only determining factor that there has been a "bump" of the mobile device is that the device moved towards an object and hit that object at some undetermined speed. This may be determined by the measured velocity and the abrupt stop in velocity. Also to be noted, in the present application, the application executing on the mobile device is processing the movement and touch data to perform a state change determination. Using the motion occurring when a user moves the wireless device to the ear, along with the understanding that a small bump occurs, the application of the present application can be aware of the appropriate time to change to a speech state.

In another embodiment of the present application, the device alone does not make the determination of the mobile device having been raised to the ear, but sends the data to a server located in the cloud to make the determination. In this embodiment, the server will receive the notification from the mobile device that a "bump" occurred, but that there was no other device associated with the device in a similar geographic location and at the same exact time. If the "bump" against another object reflects the movement associated with a user pressing the mobile device against an ear, the server will then send a notification back to the mobile device to allow the switching of the state to accept speech. In another embodiment of the present application, the user of the touch screen can enable the application of the mobile device to ascertain with accuracy that the user has brought the device up to the ear.

In computing operations, multi-touch refers to a touch sensing surface's (trackpad or touchscreen) ability to recognize the presence of two or more points of contact with the surface. This plural-point awareness is often used to implement advanced functionality such as pinch to zoom or activating predefined programs that respond to two finger inputs or other multi-touch operations. Multi-touch sensing and processing occurs via an ASIC sensor that is attached to the touch surface.

Furthermore, through an understanding of the programming of mobile devices, it is useful to drive into the technology associated with interfacing with the touch screen data. The pseudocode depicted below reflects programming of the SILVERLIGHT technology and the WINDOWS phone, but one versed in current mobile application programming will easily be able to determine similar methods that can be implemented in other operating systems without deviating from the scope of the present application.

The 'Touch.FrameReported' event serves as an application-level service, providing an underlying touch programming interface. In detail, it can be used to obtain information for each touch point whether in scope of the operating system or the entire application. Touch is a public static class, which only contains a static member, such as the 'FrameReported' event. The code used may include:

```
.namespace
System.Windows.Input
{
  public static class Touch
  {
  public static event TouchFrameEventHandler FrameReported;
  }
}
```

As can be understood, this event can be subscribed through the 'TouchFrameEventArgs' parameter in the event handler to obtain data. Now, looking at the programming of subscribing to the 'Touch.FrameReported' event, the event subscription in the sample page: TouchPage.xaml, may include:

```
public partial class TouchPage:PhoneApplicationPage
{
  public TouchPage( )
  {
  InitializeComponent( );
  Touch.FrameReported+=new TouchFrameEventHandler(Touch_FrameReported);
  }
  void Touch_FrameReported(object sender, TouchFrameEventArgs e)
  {// . . . }
}
```

Continuing to examine the class definition:
```
Public sealed class TouchFrameEventArgs:EventArgs
{
  public int Timestamp {get;}
  public TouchPoint GetPrimaryTouchPoint(UIElement relativeTo);
  public TouchPointCollection GetTouchPoints(UIElement relativeTo);
  public void SuspendMousePromotionUntilTouchUp( );
}.
```

First, the 'GetTouchPoints' method returns a collection of touch points that can be used with multiple fingers to manipulate a smartphone application and at the same time to identify the specific location for each finger. Next, the 'GetPrimaryTouchPoint' method returns the primary touch point for the current frame.

Note the primary touch point refers to the corresponding touch point when you use only one finger to touch the screen. If you use only one finger when you touch the screen, it must be the primary touch point. Consider another case: the first finger is touching the screen while the second finger is placed on the screen. In this case, the second finger isn't the primary touch point. If the user is still placing the second finger on the screen while lifting the first finger and then placing it back on the screen it is no longer the primary touch point. Primary touch point will only appear in the absence of other fingers touching the screen. 'GetPrimaryTouchPoint' and 'GetTouchPoints' both require a parameter of type 'UIElement', both returning information associated with the touch point. Next, looking more closely at the 'TouchPoint' class related definition. The code may include:

```
public sealed class TouchPoint: DependencyObject
{
  public TouchAction Action {get;}
  public Point Position {get;}
  public Size Size {get;}
  public TouchDevice TouchDevice {get;}
}.
```

TouchPoint is an abstraction of the touching finger across the screen. It provides 4 read-only properties including an Action: of enum type TouchAction, which contains 3 values: Down, Move and Up, a Position: of type Point, which is relative to the upper left corner of the referencing element (i.e., the UIElement parameter in the above-mentioned methodsGetPrimaryTouchPoint or GetTouchPoints). If the parameter passed is in a null, then the resulting position is relative to the upper left corner of the screen (the position may be negative when the incoming value is non-null). Other values may include size: of type size, corresponding to a rectangular area within the touch on the screen. TouchDevice: of type TouchDevice, contains 2 read-only properties: one is Id property (of type integer) to differentiate fingers; the other is the DirectlyOver property of type UIElement, which is the top-level UI element closest to the fingers. Note to distinguish between multiple fingers, the 'Idattribute' may be used. When a particular finger touches the screen, a series of specific events associated with the finger always begin with a down operation followed by the 'move' event, and finally 'up' event. All of these events are associated with the same Id.

Now first, subscribe to the Touch.FrameReported event; second, invoke the GetPrimaryTouchPoint or GetTouchPoints method of the TouchFrameEventArgs parameter in the event handler to obtain the corresponding touch point data. Note the function GetPrimaryTouchPoint returns a TouchPoint while the function GetTouchPoints returns a TouchPointCollection (this collection contains 0 or more TouchPoints). Last, from the TouchPoint corresponding attribute, more detailed information may be obtained. The code may provide:

```
void Touch_FrameReported(object sender, TouchFrameEventArgs e)
{
  StringBuilder sb=new StringBuilder( );
  var primaryPoint=e.GetPrimaryTouchPoint(null);
  if (primaryPoint !=null)
  {
    sb.Append("Position: X-"+primaryPoint.Position.X.ToString( )+"Y-"+primaryPoint.Position.Y.ToString( )+"\n");
    sb.Append("Action:"+primaryPoint.Action.ToString( )+"\n");
    sb.Append("TouchDeviceId:"+primaryPoint.TouchDevice.Id.ToString( )+"\n");
```

```
sb.Append("DirectlyOver:"+(primaryPoint.TouchDevi-
   ce.DirectlyOver as FrameworkElement).Name+"\n");
sb.Append("Size: Width-"+primaryPoint.Size.Width.To-
   String(    )+"Height-"+primaryPoint.Size.Height.To-
   String( )+"\n");
}
var points=e.GetTouchPoints(null);
if (points !=null)
{
   foreach (var point in points)
   {
sb.Append("Position: X-"+point.Position.X.ToString( )+
   "Y-"+point.Position.Y.ToString( )+" "+point.Action.
   ToString( )+"\n");
   }
}
textBlock1.Text=sb.ToString( );
}.
```

There are 3 types of information, Down, Move and Up, hidden inside the TouchPoint structure returned in the GetPrimaryTouchPoint method or TouchPointCollection returned in the GetTouchPoints method. In another word, when the user presses and then releases the fingers the FrameReported event will be triggered once respectively, the action information being 'Up' and 'Down', respectively. If the user moves his or her fingers on the screen, then the FrameReported event will be triggered at least 3 times, and the action information being Down, Move, and Up.

Using multi-touch technology, the application is able to detect the press of the top part of the ear pressing against the mobile device. In this embodiment, to detect the movement of the device prior to the pressing of the human ear to the mobile device is not necessary. The pressing of the ear to the mobile device is detected through the use of multi-touch is sufficient to determine that the user has the mobile device up to the ear and thus the application can switch the state of the application to the speech state with certainty.

Figure 19:
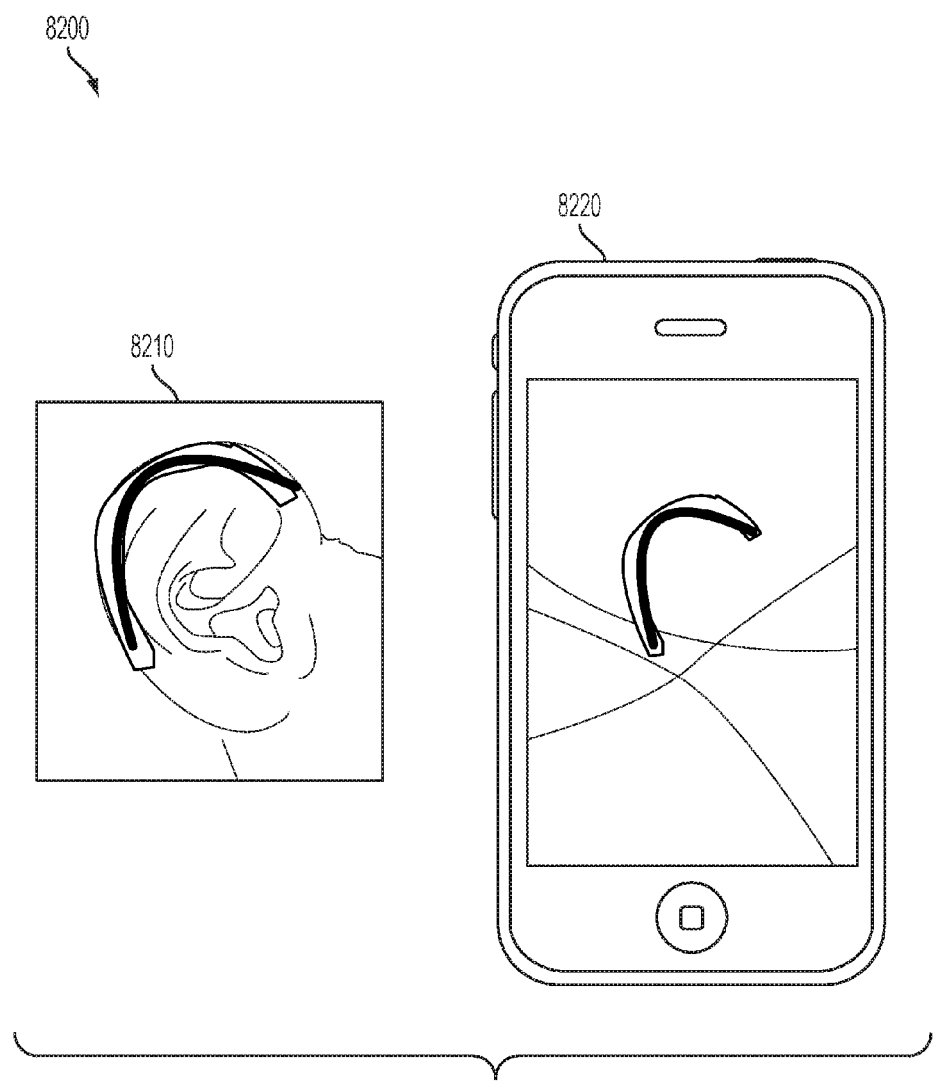
FIG. 19 illustrates an example user ear press sensor reading on a mobile station, according to example embodiments.

FIG. 19 illustrates a depiction of both the human ear and a mobile device as illustrated in 8200. The human ear 8210 is illustrated with the part of the upper ear shaded that will touch the mobile device. When bringing the mobile device up to the ear, it is customary to allow the mobile device to touch the shaded part of the ear. So customary is this action, it is determined through the present application to ascertain with certainty that the user wishes to interact with the mobile device in a speech interaction and have a previous state changed to a speech state.

There is not any other time (normally) when the pressing of the multi-touch screen in this manner will reflect the scenario other than speech interaction with the mobile device. Therefore it is appropriate to assume that if the mobile device's touch screen has indicated that this pattern is reflected on the screen, the user has the ear pressed against the mobile device. There may be other parts of the ear touching the screen outside the noted shaded portions of the ear, but what is shaded is the minimal part of the ear that will reflect that the ear is pressed against the ear. Also depicted in FIG. 19 is the mobile device 8220. This mobile device has a similar area shaded as noted in the shading of the human ear 8210. The application will be receiving data from the touch screen through the registering of the data through the authentication portion of the application. Once the application receives the data from the touch screen, verification can be made as to the type of touch that is occurring on the screen. If the multi-touch reflects points that are reflective of the ear touch 8220, then it can be assured that the user has the mobile device up to the ear and can safely switch to the speech state.

The point at which the ear multi-touches the touch screen may move up or down as related to the shaded portion of the touchscreen 8210, depending on how the user habitually places the mobile device 8220 to the ear. The shaded portion of the touchscreen 8210 serves only to depict a sample of the top portion of the user's ear if he/she places the center of the mobile phone directly over the center of the ear.

Figure 20:
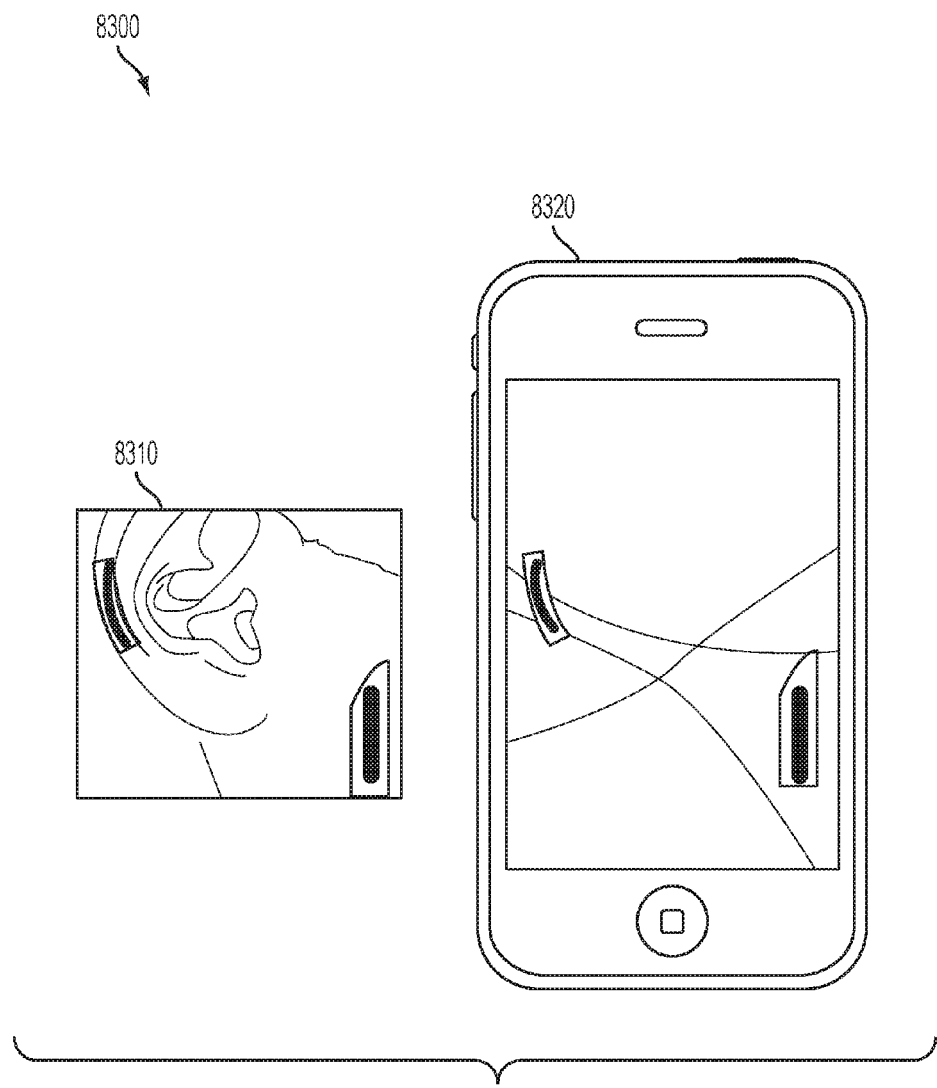
FIG. 20 illustrates another example user ear press sensor reading on a mobile station, according to example embodiments.

FIG. 20 depicts another graphic depiction of the human ear and a mobile device 8300. This figure includes shaded parts of the human ear 8310 wherein the user's ear touches the mobile device in more than one place (i.e., multi-touch). Also depicted are the parts of the mobile device's touchscreen 8320 where the same portions of the ear create multi-touches with the touchscreen. In this example, a partial section of the outer ear has touched the screen, as well as a portion of the user's cheek near the ear. It is therefore surmised that there are a number of points of the human ear and cheek where the touchscreen can be touched when a user has brought the mobile device to the ear in the attempt to make or receive a voice call. This description and associated depictions serve only to bring to the reader's attention the possible solutions and bring to light an overall solution without depicting exact data points and algorithms that may be utilized in implementing the functionality.

In this example, there are two points or areas of human touch that occurred in the same touching event. Both of these areas may be used as the basis to create a phone answering event or speech event caused by a state change in the phone. According to another example, as noted in the section entitled "Summary Message", the summary message is described as being the single message delivered to the user once an event ends or the user noting that he/she wishes to view the message. This message contains all of the incoming messages (texts, emails, voicemails) delivered to the user 12 during the event. As noted in the description of FIG. 4, the user can interact with each of the individual messages. The user 12 can also highlight some text in the detail of the message and either click or drag the highlighted text to a "More" button 450 to obtain more information wherein the highlighted text is sent to the System 18 for further processing. When viewing the summary message, additional functionality is introduced here that permits the user to easily call the contact that sent the message.

In this example, as the user clicks on one line in the summary message 410, the application responds with highlighting the selected line in the summary message. In addition to the discussed functionality (i.e., the details of the message are presented in the details component 430), the user can bring the mobile device up to the ear. The application responds by making a state change to speech from idle or ringing or whatever state the device was currently operating. In addition, the application automatically places a call to the contact that sent the highlighted message in the summary message. As discussed previously, the application has access to the user's contacts. As the user brings the mobile device up to the ear, the device is able to detect that the user is making a movement of the device that reflects one making a call. In addition to enabling the state change to speech, the application is configured to obtain the contact information associated with the contact that sent the highlighted message. The application obtains the user's phone number from the contact information and automatically places a mobile phone call to that user. The user only has to raise the phone to the ear to allow this functionality to be processed based on subsequent messages received, current movement detected by the accelerometer and/or arm movement and ear detection.

As another example, the user is presented with a corrective action window similar to that illustrated in FIG. 12. In this example, the user is presented with information from the application with the exact desired action being unknown. As a result, the system presents a choice for the user 12 to decide which action is correct. In this scenario, it would be beneficial to include functionality for the user to easily place a call to that contact to allow him/her to discuss the details. The example surrounding FIG. 12 is only one possible scenario that the system would present as a corrective action window. There are many other scenarios where a corrective action is presented to the user 12, and the placing of a call to the contact would prove to be beneficial at that time.

Upon being presented with the corrective action window, the user only has to raise the mobile device to the ear to make the call to the contact in relation to the present message displayed. The functionality allowing the device to make a state change to speech provides that the contact's phone number is obtained by the application through the previously discussed section entitled "Authentication."

As a final example, referring to FIG. 5, the button 450 is presented on the application allowing for the user 12 to obtain more information about text highlighted on the screen. The highlighted text is sent to the system 18 when the "More" button 450 is pressed. Once pressed, if the user brings the mobile device up to his or her ear, the application automatically places the device into the speech state and places a call to the contact that sent the message. This functionality permits the user to easily place a call to the contact without having to exit the application and place a call through the device's telephony application. Once the call is completed in any of the above scenarios, the telephony application is exited and the application is again presented to the user at the same state that was presented prior to the state change to speech allowing the user to continue where he/she left off.

Figure 21:
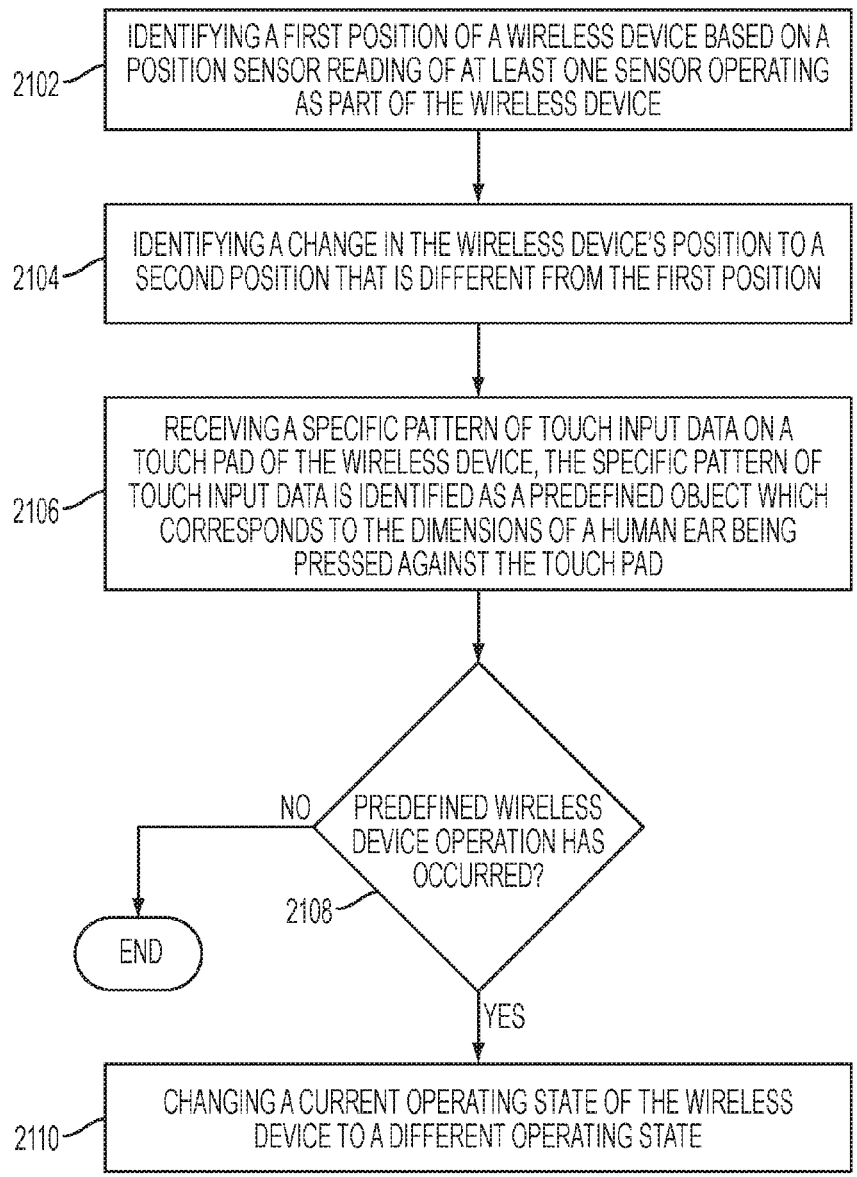
FIG. 21 illustrates another example flow diagram, according to example embodiments.

FIG. 21 illustrates a flow diagram according to one example embodiment of the present application. Referring to FIG. 21, an example method of operation according to example embodiments may provide identifying a first position of a wireless device based on a sensor reading of at least one sensor operating as part of the wireless device at operation 2102 and storing first position data corresponding to the first position in a memory. The method may also include identifying a change in the wireless device's position to a second position that is different from the first position at operation 2104 and storing second position data corresponding to the second position in the memory. The method may also include receiving a specific pattern of touch input data on a touch pad of the wireless device, the specific pattern of touch input data identified as a predefined object which corresponds to dimensions of a human ear being pressed against the touch pad at operation 2106 and processing the first position data, the second position data and the specific pattern of touch input data to create a set of gesture data. The touch pad may include any part of the wireless device that can receive information when engaged with any object such as a human finger, ear, or other appendage. The method may then provide comparing the set of gesture data to a predefined set of gesture data stored in the memory to identify whether a predefined wireless device operation has occurred at operation 2108 and if the predefined wireless device operation has occurred then changing a current operating state of the wireless device to a different operating state at operation 2110.

Figure 22:
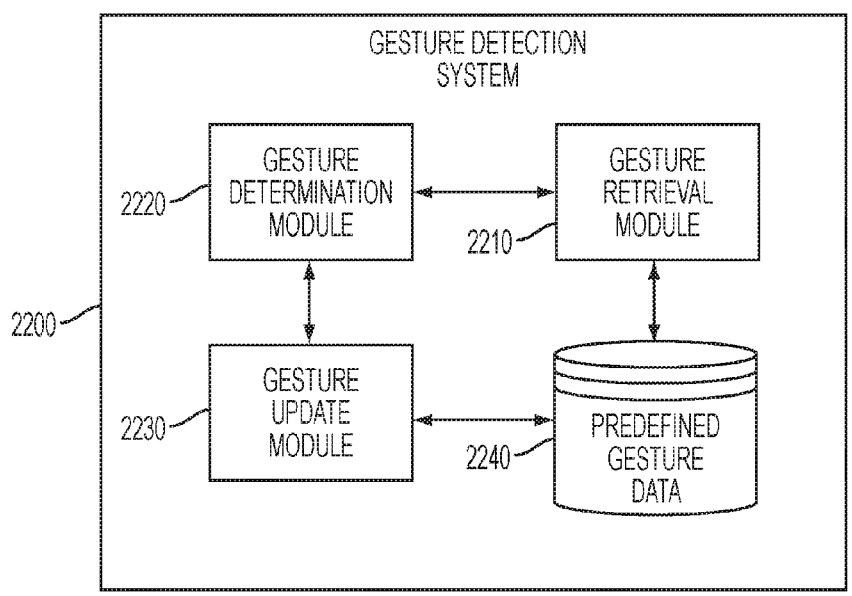
FIG. 22 illustrates an example system configuration according to example embodiments.

FIG. 22 illustrates a system diagram of an example system configured to perform a set of operations corresponding to one example embodiment of the present application. The system may be a server, computer, smartphone or any hardware device configured with memory, a processor and an operating system. Referring to FIG. 22, one example method of operation conducted by the gesture detection system 2200 may include identifying a first position of a wireless device based on a sensor reading of a sensor operating as part of the wireless device. The sensors may be based on an accelerometer or gyroscope chip or related hardware device stored inside the wireless device. The change in position may be stored as first position data corresponding to the first position in a memory, such as database 2240. The method may further provide identifying a change in the wireless device's position to a second position that is different from the first position indicating that a gesture is taking place. That second position data may also be stored in the database 2240. The method may also include storing second position data corresponding to the second position in the memory and receiving a specific pattern of touch input data on a touch pad of the wireless device, the specific pattern of touch input data identified as a predefined object which corresponds to dimensions of a human ear being pressed against the touch pad. The predefined gesture data 2240 may be used to reference the human ear by its dimensions and the input from the touch pad. The data may referenced from a predefined template for both the human ear pattern detected and the movement angles, velocity, distance, time frame and other related information received.

The gesture retrieval module 2210 may retrieve a predefined template of human movement gestures, human ear data, etc. from the predefined gesture data database 2240. The gesture determination module 2220 may compare the received data to the predefined data to process the first position data, the second position data and the specific pattern of touch input data to create a set of gesture data for comparing the set of gesture data to the predefined set of gesture data stored in the memory 2240 to identify whether a predefined wireless device operation has occurred. If so, the predefined wireless device operation will be identified as having occurred and a current operating state of the wireless device will be changed to a different operating state (e.g., from idle to active). Any updates to the predefined gesture data 2240 or history data may be kept in storage as provided by the update module 2230.

Additional operation performed by the system 2200 may include identifying a bouncing movement associated with the touch input data, the bouncing movement effect may include an initial touching against the human ear and a re-touching against the human ear and/or a sliding touch movement from one portion of the touch pad against the human ear to a second portion of the touch pad against the human ear. This example constitutes the bouncing phenomenon that may occur when a person places a phone to their ear to answer an incoming call. Also, the system may further perform identifying a multi-touch event by identifying at least two touch points on the touch pad of the wireless device at the same time or contemporaneously at two different areas on the touch pad plane. At least one of the two touch points is part of the human ear and the other may be a different part of the human ear, part of the cheek, face, neck, etc. The system may also perform receiving data via the wireless device from a base station and generating a notification on the wireless device responsive to receiving the data, such as a ringing alert or other alert. The change in the wireless device's position may be determined after the notification has been generated. The data received may be a telephone call, an email, a voicemail, a short message service (SMS) message.

The notification may be an audible message indicator, an audible telephone ringing indicator, a silent message indicator and a silent telephone ringing indicator. The example method of operation performed by the system may also include identifying the second position as being within a threshold distance of the first position, and comparing the difference between the first position data and the second position data to a predefined human arm movement vector stored in the memory 2240. The method may also include determining that the difference between the first position data and the second position data corresponds to a predefined human arm movement vector associated with answering an incoming call to the wireless device and identifying the specific pattern of touch input data as being similar to a predefined human ear touch pattern by comparing dimensions of the specific pattern of touch input data to a predefined human ear touch pattern stored in the memory. Also, the changing the current operating state of the wireless device to the different operating state may include changing an idle operating state to a voice receptive call answering operating state.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 23 illustrates an example network element 2300, which may represent any of the above-described network components, etc.

Figure 23:
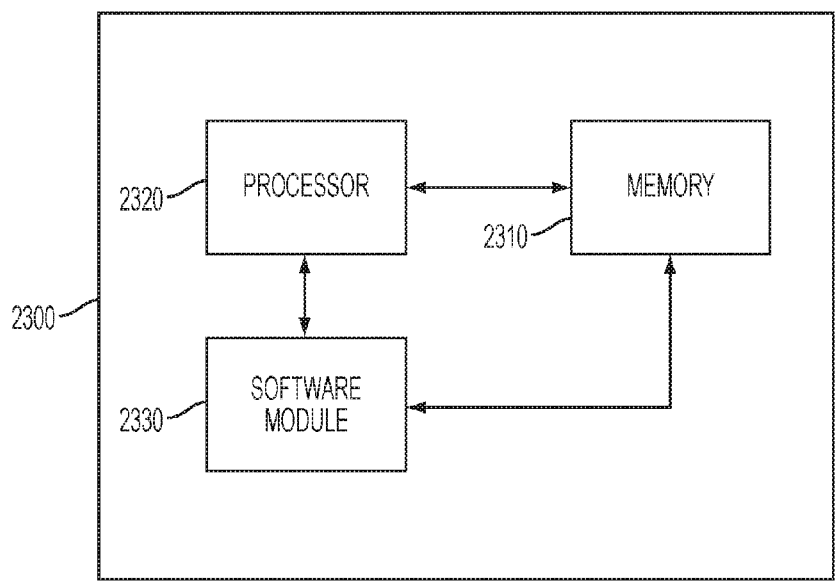
FIG. 23 illustrates an example network entity device configured to store instructions, software, and corresponding hardware for executing the same, according to example embodiments.

As illustrated in FIG. 23, a memory 2310 and a processor 2320 may be discrete components of the network entity 2300 that are used to execute an application or set of operations. The application may be coded in software in a computer language understood by the processor 2320, and stored in a computer readable medium, such as, the memory 2310. The computer readable medium may be a non-transitory computer readable medium that includes tangible hardware components in addition to software stored in memory. Furthermore, a software module 2330 may be another discrete entity that is part of the network entity 2300, and which contains software instructions that may be executed by the processor 2320. In addition to the above noted components of the network entity 2300, the network entity 2300 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining that a difference between first position data corresponding to a first position of a wireless device and second position data corresponding to a second position of the wireless device to a predefined human arm movement vector stored in memory is associated with answering an incoming call to the wireless device;
   identifying a pattern of touch input data on a touch pad of the wireless device as being similar to a predefined human ear touch pattern by comparing dimensions of the pattern of touch input data to a predefined human ear touch pattern stored in the memory; and
   changing an idle operating state of the wireless device to a voice receptive call answering operating state based on the determining and the identifying of the pattern;
   wherein a bouncing movement associated with the touch input data is identified, the bouncing movement comprising an initial touching against the human ear and at least one of a re-touching against the human ear, and a sliding touch movement from one portion of the touch pad against the human ear to a second portion of the touch pad against the human ear.

2. The method of claim 1, further comprising identifying a multi-touch event comprising at least two touch points being identified on the touch pad at the same time, wherein at least one of the two touch points is part of the human ear.

3. The method of claim 1, further comprising:
   receiving data via the wireless device from a base station; and
   generating a notification on the wireless device responsive to receiving the data, and wherein the change in the wireless device's position is determined after the notification has been generated.

4. The method of claim 3, wherein the data is at least one of a telephone call, an email, a voicemail, a short message service (SMS) message.

5. The method of claim 3, wherein the notification is at least one of an audible message indicator, an audible telephone ringing indicator, a silent message indicator and a silent telephone ringing indicator.

6. The method of claim 1, further comprising identifying the second position as being within a threshold distance of the first position.

7. A wireless device, comprising:
a touch pad configured to receive touch input data; and
a processor configured to:
identify a pattern of the touch input data on the touch pad of the wireless device, wherein the pattern of touch input data is similar to a predefined human ear touch pattern by a comparison of dimensions of the pattern of touch input data to a predefined human ear touch pattern stored in memory;
determine that a difference between first position data that corresponds to a first position of the wireless device and second position data that corresponds to a second position of the wireless device to a predefined human arm movement vector stored in the memory is associated with a call received at the wireless device that is answered;
change an idle state of operation of the wireless device to a voice receptive call answer operation state;
wherein the processor is also configured to identify a bounce movement associated with the touch input data, the bounce movement including an initial touch against the human ear and at least one of a re-touch against the human ear, and a slide touch movement from one portion of the touch pad against the human ear to a second portion of the touch pad against the human ear.

8. The wireless device of claim 7, wherein the processor is also configured to identify a multi-touch event comprising at least two touch points identified on the touch pad at the same time, wherein at least one of the two touch points is part of the human ear.

9. The wireless device of claim 7, comprising a receiver configured to receive data via the wireless device from a base station and generate a notification on the wireless device responsive to received data, and wherein the change in the wireless device's position is determined after the notification has been generated.

10. The wireless device of claim 9, wherein the data is at least one of a telephone call, an email, a voicemail, a short message service (SMS) message.

11. The wireless device of claim 9, wherein the notification is at least one of an audible message indicator, an audible telephone ring indicator, a silent message indicator and a silent telephone ring indicator.

12. The wireless device of claim 7, wherein the processor is further configured to identify the second position as being within a threshold distance of the first position.

13. A non-transitory computer readable storage medium configured to store instructions that when executed cause a processor to perform:
determining that a difference between first position data corresponding to a first position of a wireless device and second position data corresponding to a second position of the wireless device to a predefined human arm movement vector stored in memory is associated with answering an incoming call to the wireless device;
identifying a pattern of touch input data on a touch pad of the wireless device as being similar to a predefined human ear touch pattern by comparing dimensions of the pattern of touch input data to a predefined human ear touch pattern stored in the memory; and
changing an idle operating state of the wireless device to a voice receptive call answering operating state based on the determining and the identifying of the pattern;
wherein the processor is further configured to perform identifying a bouncing movement associated with the touch input data, the bouncing movement effect comprising an initial touching against the human ear and at least one of a re-touching against the human ear, and a sliding touch movement from one portion of the touch pad against the human ear to a second portion of the touch pad against the human ear.

14. The non-transitory computer readable storage medium of claim 13, wherein the processor is further configured to perform identifying a multi-touch event comprising at least two touch points being identified on the touch pad at the same time, wherein at least one of the two touch points is part of the human ear.

15. The non-transitory computer readable storage medium of claim 13, wherein the processor is further configured to perform:
receiving data via the wireless device from a base station; and
generating a notification on the wireless device responsive to receiving the data, and wherein the change in the wireless device's position is determined after the notification has been generated.

16. The non-transitory computer readable storage medium of claim 15, wherein the data is at least one of a telephone call, an email, a voicemail, a short message service (SMS) message, and wherein the notification is at least one of an audible message indicator, an audible telephone ringing indicator, a silent message indicator and a silent telephone ringing indicator.

17. The non-transitory computer readable storage medium of claim 13, wherein the processor is further configured to perform identifying the second position as being within a threshold distance of the first position.

* * * * *